(12) United States Patent
Lim et al.

(10) Patent No.: US 9,042,410 B2
(45) Date of Patent: May 26, 2015

(54) METHOD FOR CONDUCTING COMMUNICATION USING A FRAME STRUCTURE WHICH SUPPORTS TWO OR MORE WIRELESS COMMUNICATION SCHEMES

(75) Inventors: Dong Guk Lim, Anyang-si (KR); Sung Ho Moon, Anyang-si (KR); Han Gyu Cho, Anyang-si (KR); Yeong Hyeon Kwon, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 13/265,519

(22) PCT Filed: Apr. 20, 2010

(86) PCT No.: PCT/KR2010/002473
§ 371 (c)(1),
(2), (4) Date: Dec. 2, 2011

(87) PCT Pub. No.: WO2010/123260
PCT Pub. Date: Oct. 28, 2010

(65) Prior Publication Data
US 2012/0063374 A1    Mar. 15, 2012

Related U.S. Application Data

(60) Provisional application No. 61/171,072, filed on Apr. 20, 2009, provisional application No. 61/172,233, filed on Apr. 24, 2009, provisional application No. 61/218,040, filed on Jun. 17, 2009.

(30) Foreign Application Priority Data

Apr. 20, 2010 (KR) ........................ 10-2010-0036445

(51) Int. Cl.
| | |
|---|---|
| H04J 3/06 | (2006.01) |
| H04W 4/00 | (2009.01) |
| H04J 3/16 | (2006.01) |
| H04L 5/14 | (2006.01) |
| H04L 27/26 | (2006.01) |
| H04L 5/00 | (2006.01) |

(52) U.S. Cl.
CPC ............ *H04L 5/1469* (2013.01); *H04L 5/0044* (2013.01); *H04L 27/2602* (2013.01)

(58) Field of Classification Search
CPC .......................... H04W 56/001; H04W 74/006
USPC ......... 370/329, 330, 437, 480, 503, 504, 509, 370/510, 512
See application file for complete search history.

(56) References Cited

U.S. PATENT DOCUMENTS

| | | | |
|---|---|---|---|
| 2009/0092066 A1* | 4/2009 | Chindapol et al. ............ | 370/277 |
| 2009/0092090 A1* | 4/2009 | Beems Hart et al. ......... | 370/329 |
| 2009/0207762 A1* | 8/2009 | Jalloul et al. ................. | 370/329 |
| 2009/0257366 A1* | 10/2009 | Power et al. .................. | 370/280 |

FOREIGN PATENT DOCUMENTS

| | | |
|---|---|---|
| KR | 20080023903 | 3/2008 |
| KR | 100859716 | 9/2008 |

* cited by examiner

*Primary Examiner* — Redentor Pasia
(74) *Attorney, Agent, or Firm* — Lee, Hong, Degerman, Kang & Waimey

(57) ABSTRACT

Disclosed is a method for conducting communication using a frame structure which supports two or more wireless communication schemes, and an apparatus using the method. A method for constructing an FDD frame according to the present invention efficiently supports a legacy system and an enhanced system using an H-FDD frame structure. Further, the method for constructing an FDD frame according to the present invention efficiently supports a terminal and an H-FDD terminal, which use different communication systems.

11 Claims, 18 Drawing Sheets

US 9,042,410 B2

METHOD FOR CONDUCTING COMMUNICATION USING A FRAME STRUCTURE WHICH SUPPORTS TWO OR MORE WIRELESS COMMUNICATION SCHEMES

CROSS-REFERENCE TO RELATED APPLICATIONS

This application is the National Stage filing under 35 U.S.C. 371 of International Application No. PCT/KR2010/002473, filed on Apr. 20, 2010, which claims the benefit of earlier filing date and right of priority to Korean Application No. 10-2010-0036445, filed on Apr. 20, 2010, and also claims the benefit of U.S. Provisional Application Nos. 61/171,072, filed on Apr. 20, 2009, 61/172,233, filed on Apr. 24, 2009, and 61/218,040, filed on Jun. 17, 2009, the contents of which are hereby incorporated by reference herein in their entirety.

TECHNICAL FIELD

The present invention relates to a wireless communication system and more particularly to a method and apparatus for performing communication using a frame structure that supports two or more wireless communication schemes.

BACKGROUND ART

The Institute of Electrical and Electronics Engineers (IEEE) 802.16m system may support both a Frequency Division Duplexing (FDD) scheme, which includes a Half-Frequency Division Duplexing (H-FDD) Mobile Station (MS) operation scheme, and a Time Division Duplexing (TDD) scheme. The IEEE 802.16m system uses Orthogonal Frequency Division Multiplexing Access (OFDMA) as a multiple access scheme in downlink (DL) and uplink (UL).

The following is a brief description of a frame structure of an IEEE 802.16m system.

FIG. 1 illustrates a basic frame structure in the IEEE 802.16m system.

As shown in FIG. 1, each 20 ms superframe is divided into four 4 ms radio frames of the same size and starts from a superframe header (SFH). When the IEEE 802.16m system has a channel bandwidth of one of 5 MHz, 10 MHz, and 20 MHz, each 5 ms radio frame may consist of 8 subframes. Each subframe may be allocated for downlink or uplink transmission. A 1st-type subframe may be defined as a subframe including 6 OFDMA symbols, a 2nd-type subframe may be defined as a subframe including 7 OFDMA symbols, and a 3rd-type subframe may be defined as a subframe including 5 OFDMA symbols.

The basic frame structure may be applied to both the FDD scheme, including the H-FDD MS operation scheme, and the TDD scheme. In a TDD system, each radio frame has two switching points. The switching points may be defined according to change of the directionality from downlink to uplink or from uplink to downlink.

An H-FDD Mobile Station (MS) may be included in the FDD system. From the viewpoint of the H-FDD MS, the frame structure is similar to the TDD frame structure. However, downlink and uplink transmission are performed in 2 individual frequency bands. Transmission gaps between downlink and uplink (or between uplink and downlink) are required for switching between transmission and reception circuits.

FIG. 2 illustrates an example of an FDD frame structure of a 5 MHz, 10 MHz, or 20 MHz channel bandwidth, whose CP length is ⅛ of an effective symbol length.

As shown in FIG. 2, a Base Station (BS) that supports the FDD scheme can support both a half-Duplexing MS and a full-Duplexing MS that operate with the same RF carrier. The MS that supports the FDD scheme needs to use one of the H-FDD or FDD scheme. All subframes may be used for downlink and uplink transmission. Downlink and uplink transmission may be discriminated in the frequency domain. One superframe may be divided into 4 frames and one frame may consist of 8 subframes.

As described above, the IEEE 802.16m system needs to support both a Half-Frequency Division Duplexing (H-FDD) scheme and a Full-Frequency Division Duplexing (F-FDD) scheme and also needs to support an MS that uses the legacy system. However, a frame structure that supports both an MS that uses the legacy system and an MS that uses the advanced system has not been suggested until now. In addition, no studies have been conducted on a frame structure that can support not only 2 or more wireless communication schemes but also an MS that uses the H-FDD frame structure. Accordingly, there is a need to study a frame structure that can support both the legacy MS and an MS that uses the H-FDD frame structure.

DISCLOSURE

Technical Problem

An object of the present invention devised to solve the problem lies in a method for performing communication using a frame structure that supports 2 or more wireless communication schemes.

Another object of the present invention devised to solve the problem lies in an apparatus for performing communication using a frame structure that supports 2 or more wireless communication schemes.

Objects of the present invention are not limited to those described above and other objects will be clearly understood by those skilled in the art from the following description.

Technical Solution

A method for performing communication at a mobile station (MS) using a frame structure that supports two or more wireless communication schemes according to the present invention to achieve the above objects includes receiving control information including zone allocation information corresponding to a communication scheme of the MS from a base station, and performing communication with the base station (BS) through a zone that is allocated to the MS based on the received zone allocation information, wherein the zone allocation information includes subframe configuration information and offset information including a start point of the zone allocated to the mobile station, the subframe configuration information includes a number of subframes or symbols of the zone and a number of symbols allocated for each subframe of the zone, and the zone includes one of a downlink zone and an uplink zone.

A mobile station (MS) for performing communication using a frame structure that supports two or more wireless communication schemes according to the present invention to achieve the above objects includes a Radio Frequency (RF) unit for receiving control information zone allocation information corresponding to a communication scheme of the mobile station from a base station (BS), and a processor for controlling the MS to perform communication with the BS through a zone that is allocated to the MS based on the received zone allocation information, wherein the zone allocation information includes subframe configuration information and offset information including a start point of the zone allocated to the mobile station, the subframe configuration information includes a number of subframes or symbols of the zone and a number of symbols allocated for each subframe of the zone, and the zone includes one of a downlink zone and an uplink zone.

Advantageous Effects

According to the FDD frame configuration method according to the present invention, it is possible to efficiently support the legacy system and the advanced system using an H-FDD frame structure.

In addition, according to the FDD frame configuration method according to the present invention, it is possible to efficiently support a mobile station and an H-FDD mobile station that use different communication systems.

Advantages of the present invention are not limited to those described above and other advantages will be clearly understood by those skilled in the art from the following description.

DESCRIPTION OF DRAWINGS

Advantages of the present invention are not limited to those described above and other advantages will be clearly understood by those skilled in the art from the following description.

BEST MODE

Figure 1:
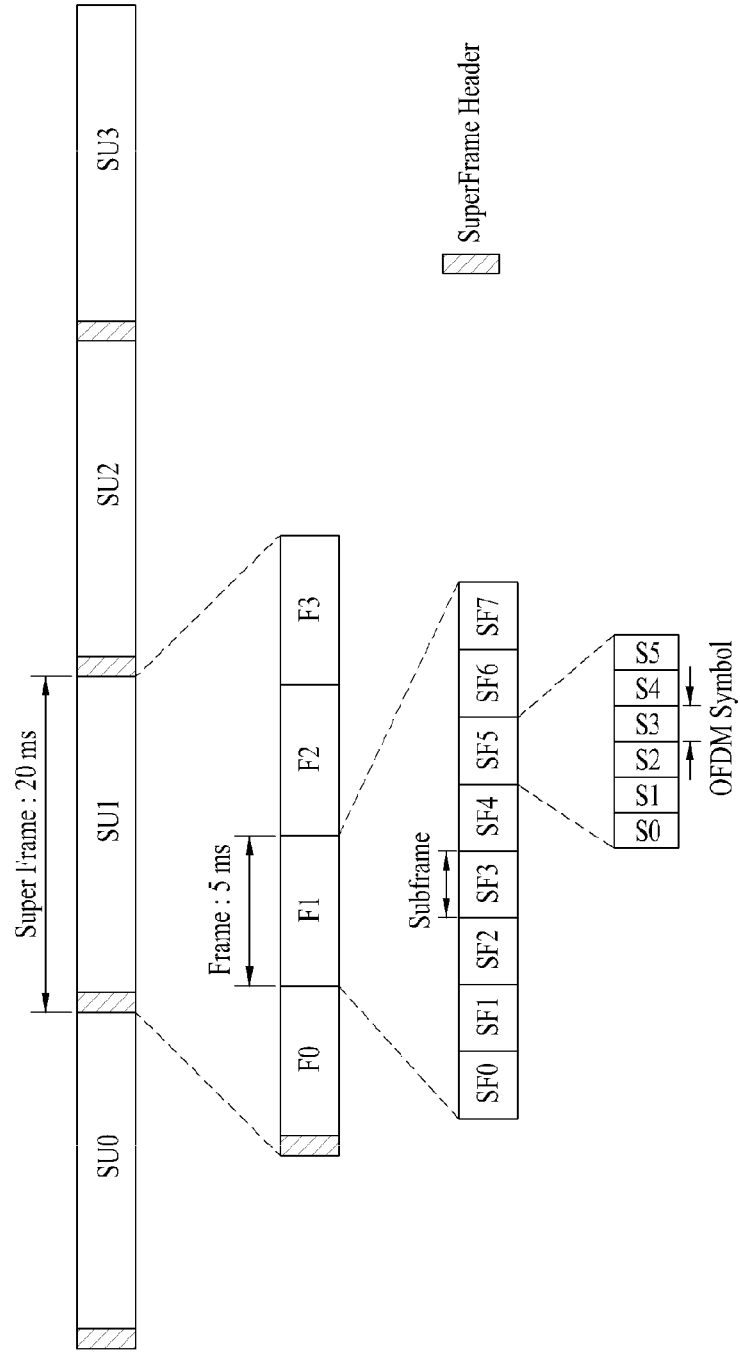
FIG. 1 illustrates a basic frame structure in an IEEE 802.16m system.
Figure 2:
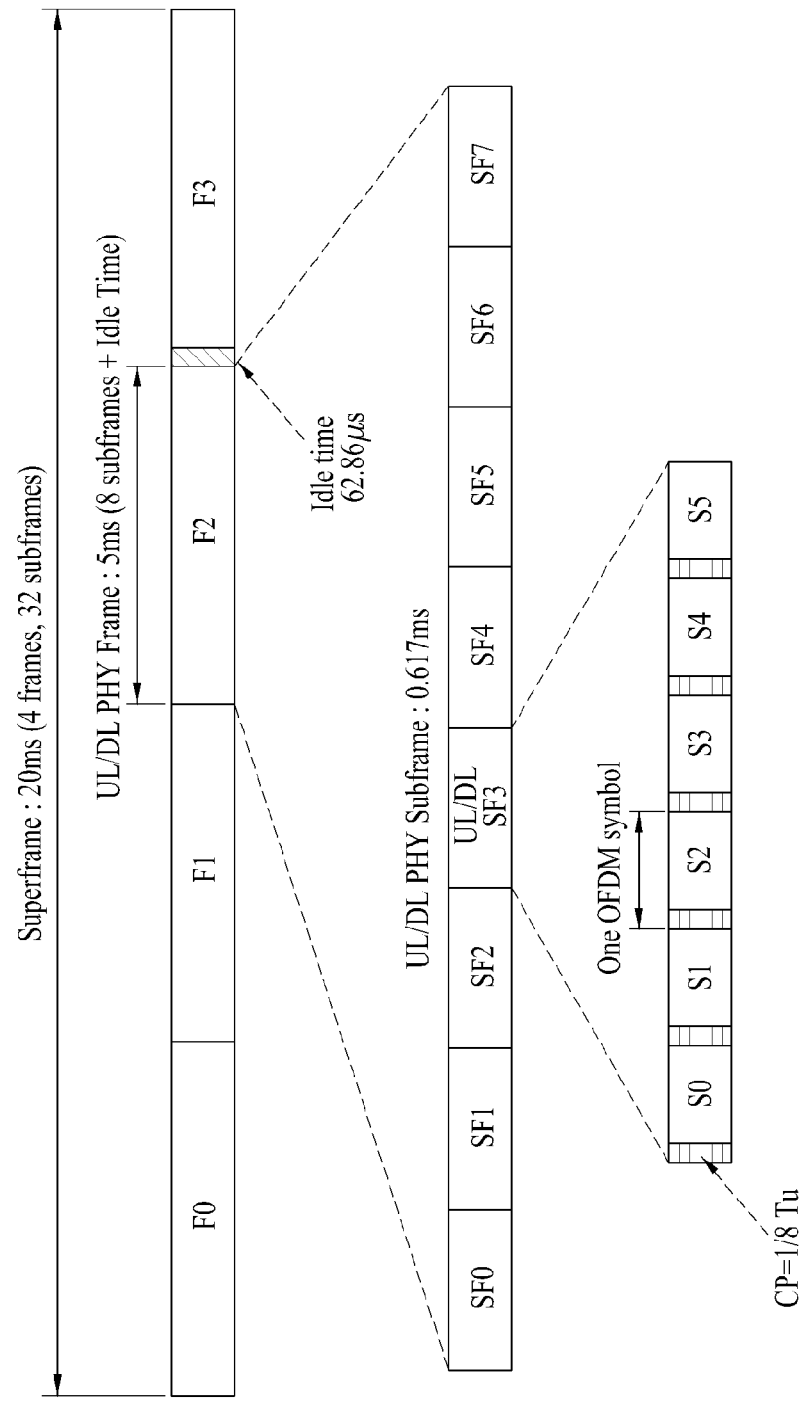
FIG. 2 illustrates an example of an FDD frame structure of a 5 MHz, 10 MHz, or 20 MHz channel bandwidth, whose CP length is ⅛ of an effective symbol length.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the mobile communication system is a 3GPP-LTE system, the following descriptions, except descriptions specific to 3GPP-LTE, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "Mobile Station (MS)" or "terminal" is used to generally describe any mobile or stationary user device such as a User Equipment (UE) or an Advanced Mobile Station (AMS). In addition, the term "Base Station (BS)" is used to generally describe any network node that communicates with the terminal such as a Node B, an eNode B, or an Access Point (AP).

In a mobile communication system, an MS (or user equipment) may receive information from a BS through downlink and may transmit information through uplink. Information transmitted or received by the MS includes data and various control information and various physical channels are present according to the types of information transmitted and received by the MS.

In the present invention, the term "Full-FDD (F-FDD) MS" refers to an MS that uses an F-FDD frame structure and "H-FDD MS" refers to an MS that uses an H-FDD frame structure. The term "legacy system" refers to a system that uses a communication scheme prior to IEEE 802.16m. One example of this system is an IEEE 802.16e system.

In the following, a description will be given of an FDD frame structure that supports both a WirelessMAN-OFDMA system (for example, IEEE 802.16e system) which is a legacy system and an advanced air interface system (for example, an IEEE 802.16m system) which is a next generation system. The types and definitions of the legacy system and the advanced system described here are only an example which does not limit the types and definitions of the two systems. Here, in order to support both systems, it is basically assumed that (regions of) the two systems are present together within one frame using a Time Division Multiplexing (TDM) scheme. An MS that uses the IEEE 802.16m system which is an example of the next generation system is referred to as a "16m MS" for short and an MS that uses a legacy system is referred to as a "legacy MS" or "16e MS" for short. The term "MS" may be used as a term including "16m MS" and "legacy MS".

The two systems that are present together may be supported using a Half-Frequency Division Duplexing (H-FDD) frame structure. Here, in the H-FDD structure, each MS may be classified into two groups in order to support H-FDD MSs that use the same systems. The respective orders of downlink and uplink zones allocated to the two groups are opposite to each other. That is, when a downlink zone and an uplink zone are sequentially allocated to an MS of the first group, an uplink zone and a downlink zone are sequentially allocated to an MS of the second group.

Frames may be allocated to two different systems as when frames are allocated to respective groups of the two different systems in the H-FDD frame structure. Here, there is a need to configure an H-FDD structure such that an uplink frame does not overlap with an interval in which important information (for example, a preamble, a SuperFrame Header (SFH), or a Frame Control Header (FCH)) is transmitted since an MS belonging to each group should receive such important information through downlink.

Since DL and UL zones of the two systems are arranged in opposite order in order to support the two systems, it is possible to allocate and use an interval which has not been able to be used in a UL zone to transmit important information. That is, an MS that uses IEEE 802.16m does not need to receive important information (for example, a preamble or an FCH) that is transmitted through a DL zone in order to support the legacy MS, it is possible to use a region allocated for the important information without setting an idle time. Accordingly, it is possible to efficiently use a UL zone that is used by the 16m MS since there is no need to additionally allocate an idle time in the UL zone.

In addition, a DL zone is divided according to a TDM scheme to allow two different systems to support an H-FDD MS and an interval for switching from uplink to downlink or from downlink to uplink is allocated to the uplink, such that a DL gap, which is present between two DL zones in the conventional H-FDD structure, can be set to "0". Accordingly, it is possible to efficiently use the DL zone since there is no need to allocate an additional idle time in the DL zone.

Figure 3:
FIG. 3 illustrates an example of an FDD frame structure for supporting a legacy system using an H-FDD frame structure.

FIG. 3 illustrates an example of an FDD frame structure for supporting a legacy system using an H-FDD frame structure.

The FDD frame structure shown in FIG. 3 can support both the legacy system and the IEEE 802.16m system without affecting the legacy MS since the FDD frame structure uses the conventional H-FDD structure. That is, in the case in which the FDD frame structure shown in FIG. 3 is used, it is possible to simultaneously support the legacy MS and the IEEE 802.16m MS without an additional operation. Here, the legacy MS can acquire (determine or identify) information of a region allocated to the legacy MS using zone change information, a DL_OFFSET, a group indicator, DL/UL allocation information (for example, DL/UL start points, length, the number of OFDMA symbols, zone configuration information, etc.) included in DL/UL maps, and a Transmit Transition Gap (TTG)/Receive Transition Gap (RTG) received through a Downlink Channel Descriptor (DCD) that is conventionally transmitted.

Similar to the legacy MS, the 16m MS can also determine the start point of the downlink zone or the start point of the uplink zone by receiving a DL/UL_offset from the BS. In addition, the 16m MS can receive information associated with a group indicator, a subframe configuration in the allocated DL/UL zone, a DL/UL length (i.e., the number of OFDMA symbols) (i.e., the total length of subframes allocated to the DL/UL zone), and the number of allocated subframes, together with the DL/UL_offset information from the BS. In this manner, the 16m MS may also use the FDD frame structure suggested as shown in FIG. 3 by receiving information associated with the allocated resource region from the BS.

Through the offset information (DL_offset or DL/UL_offset) or the group indicator received from the BS, the MS can determine that data is being received using the H-FDD frame structure and can also determine (or identify) the allocated region. When the allocated region is to be changed, the MS can confirm change of the allocated region through the group indicator. When the DL/UL_offset of the region allocated to the MS has been fixed within a superframe, all frames in the superframe may be configured with the same structure. Here, the DL/UL_offset information may be transmitted while being included in important information (for example, an Advanced-preamble (A-preamble) or a superframe header) transmitted in the first frame of the superframe. The MS can identify (or determine) the allocated resource region by receiving the DL/UL_offset information included in the important information. On the other hand, in the case in which the DL/UL region allocated within the superframe flexibly changes or in the case in which the first frame, which transmits the important information (for example, an A-preamble or a superframe header) within the superframe, and the remaining frames which do not transmit important information use different DL/UL regions, the resource information may be transmitted to the MS through inclusion in an A-MAP which is transmitted every frame. The MS may receive resource region information included in the A-MAP which is received every frame.

The MS may identify (determine or acquire) information of the allocated DL/UL zone using information associated with the number of subframes, a length (or the number of symbols), and an offset of the DL/UL zone which is transmitted every frame. Here, a DL/UL offset value which indicates the position of the UL zone allocated for the legacy system as shown in FIG. 3 can be represented as in the following Equation 1.

$$DL/UL\ offset = T_{L\_DL}(\text{legacy DL zone length}) + TTG1$$

The DL/UL offset shown in Equation 1 can be applied when a DL zone allocated to the legacy system and a DL zone allocated to an advanced system (for example, a 16m system) are identical (i.e., have the same size) in the case in which an idle time is not present between the two groups for supporting the systems in the DL zones as shown in FIG. 3. Accordingly, in the case in which the groups are allocated in the opposite order to that shown in FIG. 3, the MS can also identify information of the allocated region using the offset value of Equation 1. Using the offset, the BS can sufficiently support the legacy and advanced systems within the frame.

In the case in which the start point of the UL zone is not the start of the frame, the MS may determine the start position of the UL zone by receiving the DL/UL offset (DL/UL_offset) of the start position of the UL zone from the BS. Here, the DL/UL offset may be transmitted from the BS on a symbol in unit of symbol (or by symbol basis) or on a subframe in unit of subframe (or by subframe basis) depending on the system that uses the allocated region.

As described above, if an idle time is not allocated between the downlink zones of the two systems in DL, there is a need to allocate an interval RTG2 between the UL zone and the DL zone for the 16m MS as shown in FIG. 3. The interval RTG2 is a switching gap required for the 16m MS to receive important information (for example, an A-preamble or a superframe header) transmitted through the DL zone. Here, one symbol of the last subframe allocated in the UL zone may be allocated as the RTG2. Accordingly, in the case in which the last subframe is a type-1 subframe which consists of 6 symbols, one symbol may be allocated as a switching gap such that the last subframe has a structure of subframe constructed by 5 symbols. That is, at a point where the uplink and the downlink are switched, the last subframe of the UL may have a subframe structure, in which each subframe includes a number of symbols that are 1 symbol less than the number of symbols of the conventional subframe structure. The last subframe of the UL may consist of 5 symbols. Accordingly, it is preferable that control information and channels of the last UL subframe consist of 5 symbols. However, this is only an example in which the last subframe is type-1 and is not intended to limit the type of a subframe formed without one symbol for a gap in the last subframe In the FDD frame structure suggested in FIG. 3, 6×n symbols (where n is the number of subframes allocated to the legacy DL zone) may be allocated in the legacy DL zone. In addition, in the case in which one symbol is allocated for a switching interval such as a TTG or an RTG in the legacy UL zone, 5+6×n symbols (where n is the number of subframes allocated to the DL zone) may be allocated in the legacy UL zone. 6×k symbols may be allocated in the 16m DL zone and 5+6×k symbols (where k is the number of subframes allocated to the 16m DL zone minus 1) may be allocated for use as an idle time for a switching interval in the 16m UL zone. In the UL zone, allocation of one symbol for the switching interval such as a TTG or an RTG in the UL zone is only an example and two or more symbols may be allocated for such a switching interval.

In the FDD frame structure shown in FIG. 3, an unnecessary idle time is removed in the downlink to construct a DL zone of subframes, each including 6 symbols, thereby allowing MSs to efficiently use regions allocated to the MSs. Allocation of a subframe including 5 symbols as the last subframe in the 16m UL zone is only an example without intention to limit the location of allocation the subframe. In the 16m UL zone, subframes, each including 6 symbols, and subframes, each including 5 symbols, are allocated to construct a frame and therefore the MS can receive subframe-related information (for example, the number of symbols, subframe type information, and the like) of the DL/UL zones through an A-MAP of each frame and an important signal (for example, an A-preamble or a superframe header).

In the case in which an idle time corresponding to an RTG2 allocated for downlink switching in the UL for a 16m MS is less than $T_{I,DL}$, as shown in FIG. 3, there is no need to allocate an additional symbol for the DL/UL switching interval. In this case, a frame may be constructed using a conventional subframe structure, in which each subframe consists of 6 symbols, in both DL and UL. When the two systems are supported using such an FDD frame structure, an FDD frame structure for supporting the two systems suggested in FIG. 3 may be flexibly constructed in the case in which an MS that uses another system is not present, in the case in which there is no need to transmit a signal to an MS of another system (i.e., in the case in which an MS of another system operates in a sleep mode or an idle mode), or in the case in which the number of MSs of another system is very small. Accordingly, in these cases, the FDD frame structure may be configured such that more resources can be allocated for use in one of the systems.

In addition, in the case in which a gap required for DL/UL switching is taken into consideration only in the UL zone as shown in FIG. 3, one or more symbols in a specific subframe among subframes allocated to the 16m system may be allocated to the legacy system in order to use a control channel which consists of a conventionally-defined type-1 subframe in the UL zone allocated to the 16m system, unlike FIG. 3. For example, in the case in which one symbol in a DL subframe is used for the legacy system, the number of symbols allocated to the legacy system may be expressed as 7+6×n and the number of symbols allocated to the 16m system may be expressed as 5+6×k.

In addition, the number of symbols allocated to the 16m UL zone may be expressed as 6×N and the number of symbols allocated to the legacy UL zone may be expressed as 4+6×M. In this case, a gap is also not present between the two systems in the downlink as shown in FIG. 3. Accordingly, an idle time required between the downlink and the uplink in the DL zone may be additionally allocated to the legacy system in the DL zone such that it is possible to use a given frame without generating an additional idle time.

Figure 4:
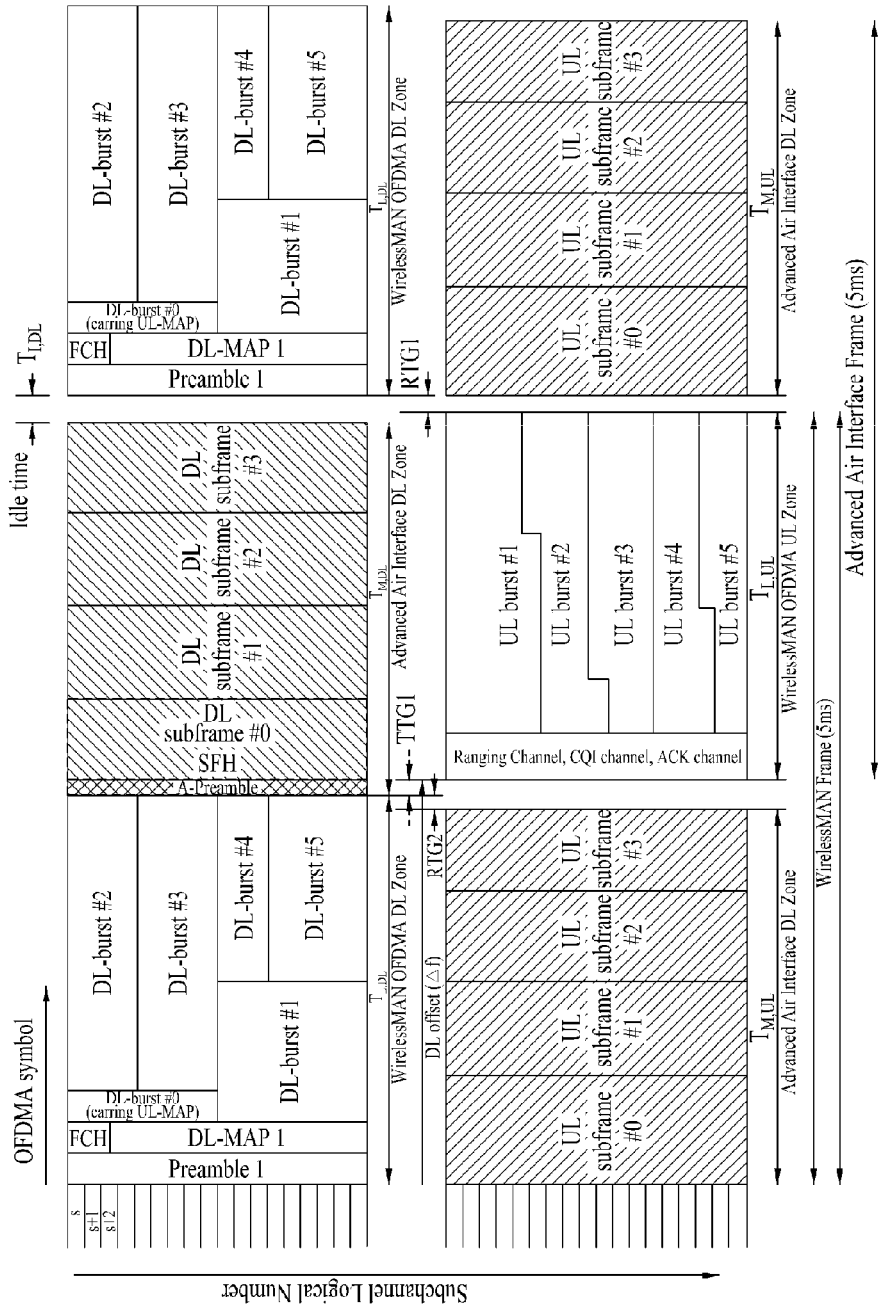
FIG. 4 illustrates an example of an FDD frame structure for supporting the legacy system using an H-FDD frame structure.

FIG. 4 illustrates an example of an FDD frame structure for supporting the legacy system using an H-FDD frame structure.

Specifically, FIG. 4 illustrates that one symbol is allocated in a DL zone to achieve a frame structure having a type-3 subframe. The position of the type-3 subframe illustrated in FIG. 4 is only an example.

Contrary to the examples of FIGS. 3 and 4, it is also possible to consider the case in which an interval for DL/UL switching is allocated only in the DL zone. In this case, an additional idle time (i.e., gap) between the two systems is not needed in the UL zone. Accordingly, in the case in which a symbol is allocated in the downlink to form a gap, contrary to the example of FIG. 3, the respective numbers of symbols allocated to the downlink and the uplink in the legacy system may be expressed as 5+6×n and 6×k. On the other hand, in the case of the 16m system, 5+6×n symbols may be allocated to the downlink and 6×k symbols may be allocated to the uplink. Further, it is also possible to consider the case in which a symbol for an idle time is additionally allocated to the legacy or 16m UL zone so as not to form a gap between the uplinks of the two systems.

If a symbol is additionally allocated to a 16m UL zone, 7+6×n symbols are allocated to the 16m UL and 4+6×n symbols are allocated to the 16m DL. Accordingly, a type-2 subframe is formed in the 16m UL and a subframe including 4 symbols is formed in the 16m DL. In the case of the legacy system, the number of symbols allocated in the downlink is 5+6×n. In the case in which one symbol is additionally allocated to the legacy system, the number of symbols allocated to the downlink is 6×k while 5+6×k symbols may be allocated to the uplink. In the case in which one symbol is allocated to the legacy system in a UL zone, the respective numbers of symbols allocated to the downlink and the uplink of the legacy system may be expressed as 4+6×n and 7+6×n. In the case of the 16m system, 6×k symbols and 5+6×k symbols may be allocated to the downlink and the uplink.

It is also possible to consider the case in which a subframe including 5 symbols in a UL zone structure is used for a DL zone structure such that data is transmitted using conventionally-defined subframes, each including 6 symbols, in the uplink and the last DL subframe is constructed of 5 symbols. That is, when one symbol is allocated as an interval for DL/UL switching in the IEEE 802.16m, one symbol for an idle time may be additionally allocated to a DL zone. This FDD structure may be represented as illustrated in FIG. 5.

Figure 5:
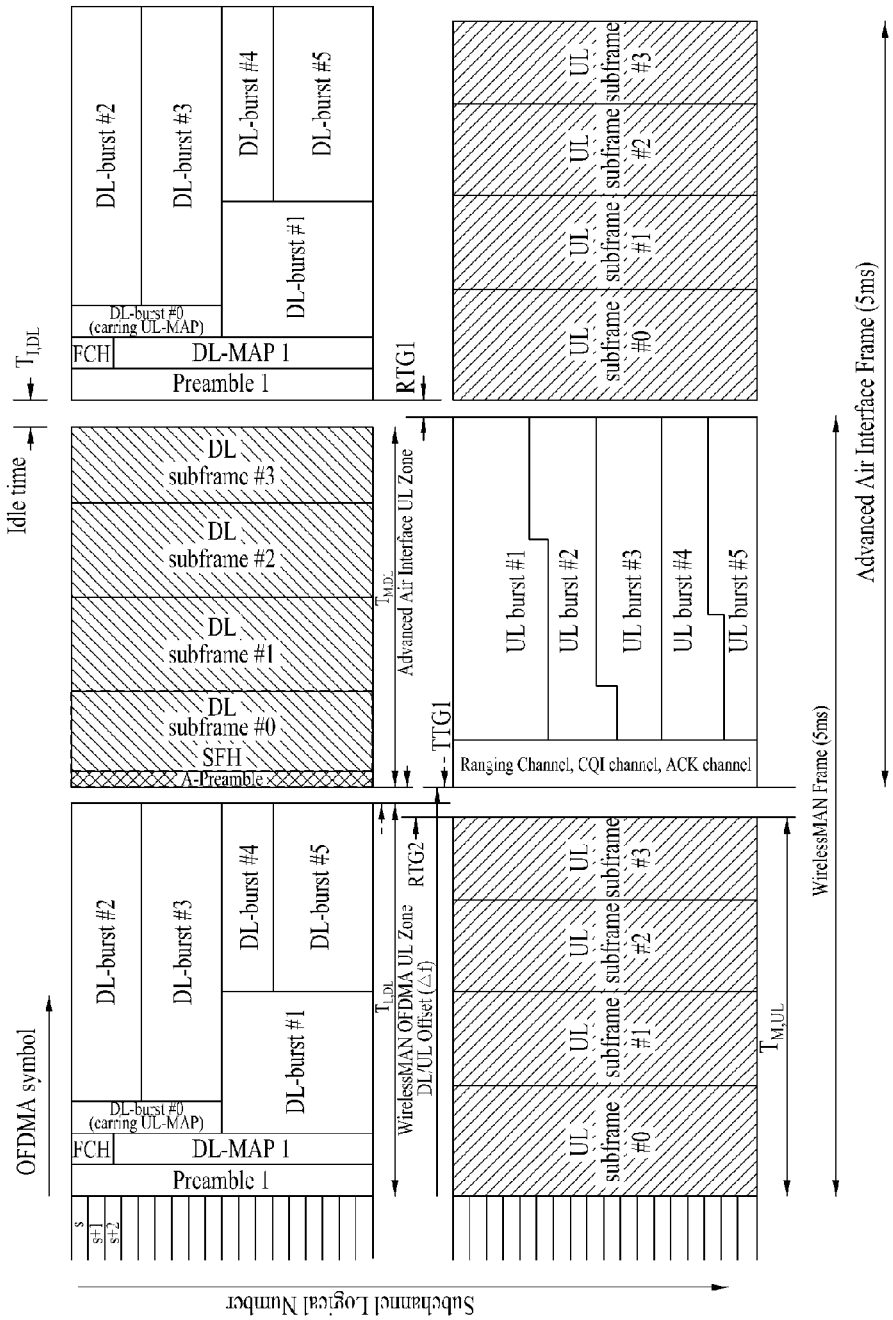
FIG. 5 illustrates an example of an FDD frame structure for supporting the legacy system using an H-FDD frame structure.

FIG. 5 illustrates an example of an FDD frame structure for supporting the legacy system using an H-FDD frame structure.

In FIG. 5, one symbol of the last subframe of a DL zone allocated to IEEE 802.16m may be allocated for use as an interval for DL/UL switching. Accordingly, the last subframe of the 16m downlink has a frame structure constructed by 5 symbols. In the frame structure of the DL zone, an interval between the legacy system and the IEEE 802.16m system may be removed as shown in FIG. 3 and an additional idle time may be allocated for DL/UL switching of the legacy system of the legacy system taking into consideration TTG1 of the legacy system. In the IEEE 802.16m frame structure, one symbol of the last subframe of the downlink has been allocated and used for an interval for switching between the downlink and the uplink and therefore it is possible to construct a frame using a basic subframe structure in which each subframe consists of 6 symbols in the UL zone as defined conventionally.

As described above, 6×n symbols are basically allocated to the legacy system in unit of subframe (or on a subframe basis) and, in the case in which one symbol is allocated to a TTG/RTG, 5+6×n symbols may be allocated to construct DL and UL zones. On the other hand, in the case of IEEE 802.16m, 6×k symbols may be allocated to construct a frame in the uplink in order to use conventional control channels, each including 6 symbols. Here, one symbol may be allocated and used as an idle time for the switching interval. Accordingly, the number of symbols allocated to construct a downlink zone may be expressed as 5+6×k. Here, after one symbol is allocated for a DL/UL switching interval, the subframe which consists of 5 symbols may be allocated to an arbitrary position in the downlink zone. In addition, one or more symbols in the DL zone or the UL zone may be punctured or allocated as an idle time as described above.

Accordingly, as described above, information associated with subframes which constitute a frame in the DL/UL may be transmitted through an A-MAP and, if each frame uses the same structure, the information may be transmitted within an important signal (A-preamble or a superframe header) through the first frame of the superframe. In order to use the frame structure shown in FIG. 5, the BS needs to transmit information associated with the DL/UL zone to each system. As described above with reference to FIG. 3, a variety of information included in a control signal transmitted to the legacy system is transmitted using a DCD or a DL/UL map without affecting the existing system. In the case of IEEE 802.16m, the MS may receive, from the BS, a DL/UL offset of the allocated resource region, information of the allocated zone (i.e., information regarding the number of subframes or the entire length (or duration) of the zone which is expressed, for example, in units of subframes or in units of symbols), a group indicator, or the like. Here, the 16m MS may receive these information items from the BS every superframe, every frame, or every subframe through a superframe header or an A-MAP.

As described above with reference to FIG. 5, when the legacy system and the 16m system are supported using an H-FDD frame structure, it is possible to consider a method in which an idle time is set in unit of subframe (or on a subframe basis) for a transition gap in addition to setting of an idle time in unit of symbol (or on a symbol basis) for a DL/UL switching interval required by the H-FDD MS. Since the 16m system configures a frame in unit of subframe (or on a subframe basis), existing 16m F-FDD (full-FDD) MSs should not be affected when a legacy MS is supported using the H-FDD structure as shown in FIGS. 6 and 7.

Figure 6:
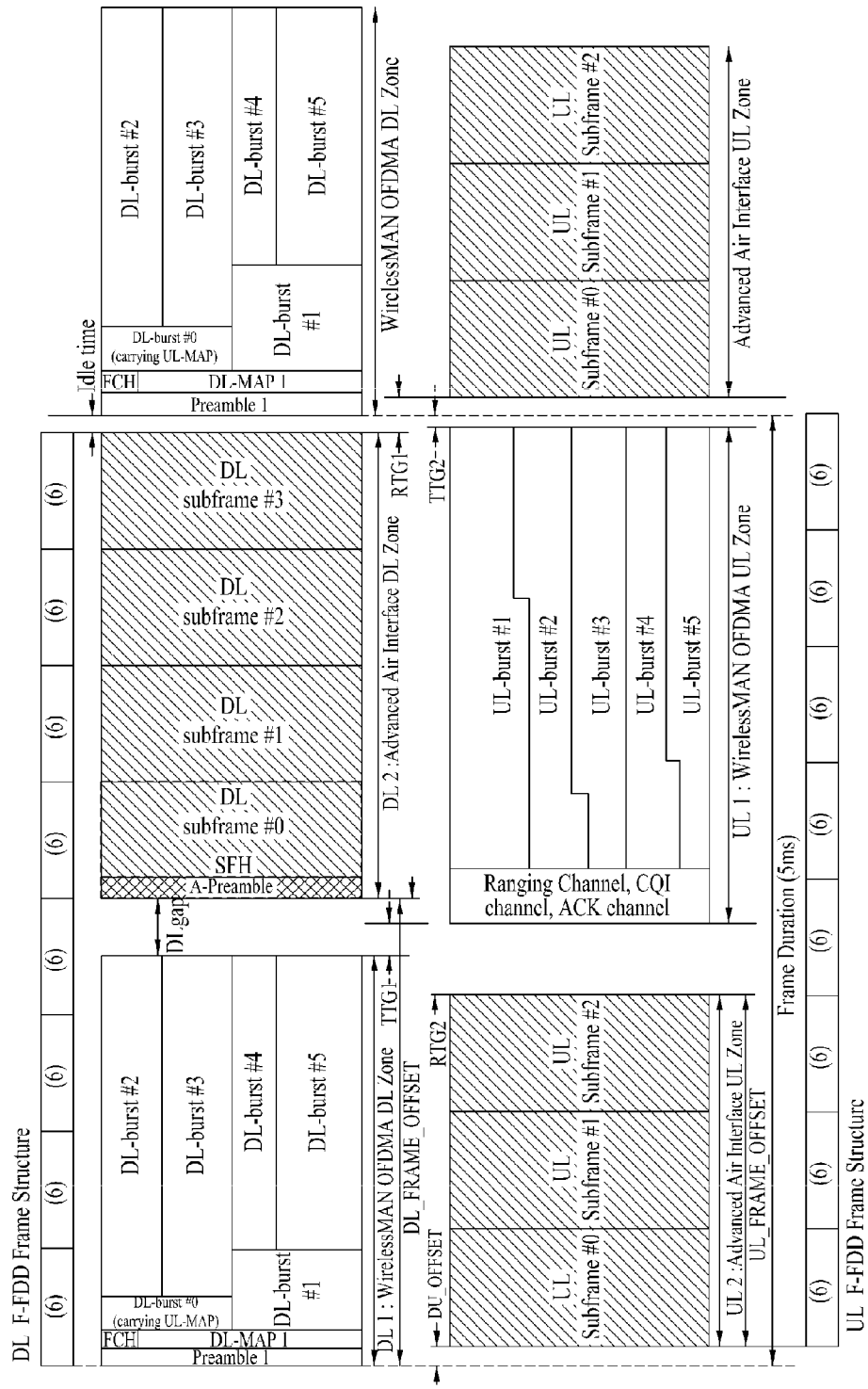
FIGS. 6 and 7 illustrate an example of an FDD frame structure for supporting the legacy system using an H-FDD frame structure.
Figure 7:
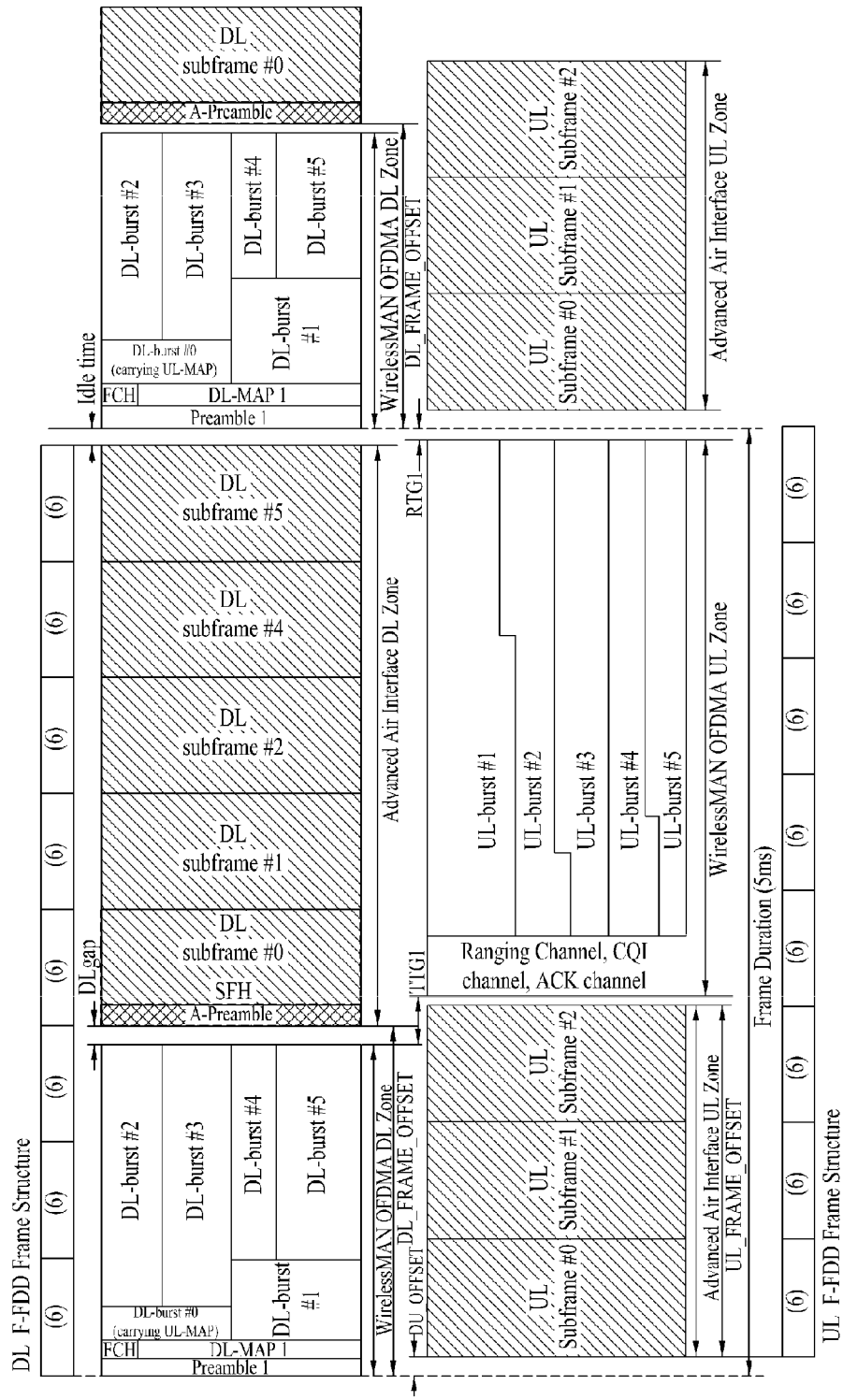

FIGS. 6 and 7 illustrate an example of an FDD frame structure for supporting the legacy system using an H-FDD frame structure.

A subframe that is allocated for an idle time for DL/UL switching may be allocated to a DL zone or a UL zone. For example, when the legacy system is supported using an FDD frame structure having a Cyclic Prefix (CP) length of ⅛ in a 5/10/20 MHz band, an H-FDD structure may be formed to simultaneously support the legacy MS and the 16m MS.

Here, the 16m H-FDD MS may determine the position and size of the allocated region by receiving a DL frame offset DL_FRAME_OFFSET, a UL frame offset UL_FRAME_OFFSET, and a DU offset DU_OFFSET from the BS through a superframe header or additional broadcasting information (ABI). Here, the DL_FRAME_OFFSET indicates the duration from the start point of the legacy region to the start time of the 16m region and may be represented in units of subframes. Accordingly, the DL_FRAME_OFFSET may indicate the start point of a DL zone allocated to the 16m H-FDD MS. The UL_FRAME_OFFSET indicates the duration of a UL zone allocated to 16m and may be represented in units of frames, similar to the DL_FRAME_OFFSET. Accordingly, the H-FDD MS may determine the position and size of the DL zone and the size of the allocated UL zone using the DL_FRAME_OFFSET and the UL_FRAME_OFFSET received from the BS.

Further, information of a zone allocated to the legacy system may be used in order to determine information of an allocated region without using signals described above. For example, it is possible to receive information of the number of symbols allocated to the legacy zone through a superframe header or ABI from the BS. The 16m MS may determine the number of subframes allocated to the legacy system by calculating the number of subframes (each including 6 symbols) corresponding to the received information of the number of symbols and may then determine information of the subframes allocated to the 16m MS based on the number of subframes allocated to the legacy system. For example, when the number of symbols allocated to the legacy system in the DL zone is 15, the number of subframes allocated to the legacy system is 3(ceil(15/6)=3). Here, ceil( ) is a function to round up a number. In the case in which a switching interval required for the 16m H-FDD MS is allocated to a specific subframe of the UL zone, the number of subframes allocated to the DL zone of the 16m system is 5 (i.e., 8−the number of DL subframes(3)=5)). Therefore, the start point of the 16m DL zone is the 4th subframe. Since the UL zone is limited by the DL zone or the DL zone is limited by the UL zone, the number of subframes allocated to the UL zone can be determined using information of the transition gap and the obtained DL zone information.

Since the zone allocated to the legacy system is constructed in units of symbols, a DL gap DLgap formed between the two systems in the downlink may be defined in units of symbols and may have an integer value of 0, 1, 2, 3, 4, 5, or 6. The size of the UL zone of the legacy system may vary depending on the size of the gap. Since the interval required for switching has already been determined in the case of the legacy system, the UL zone starts after the switching interval TTG1 is applied from the end point of the DL zone as shown in FIG. 6. An idle time for UL/DL switching or DL/UL switching needs to be set in order to support the 16m H-FDD MS. Here, one subframe of a UL zone allocated for the 16m H-FDD MS may be allocated and used for the switching interval. Here, an interval TTG2 required for switching may also be set using a DU-OFFSET value as shown in FIG. 6. The interval required for DL/UL switching cannot be generated using the idle time present in the FDD frame structure.

Accordingly, the required interval TTG2 may be set by applying an offset value to the start point of the UL zone using the DU_OFFSET as described above. Here, the DU-OFFSET indicates the timing difference between the DL zone and the UL zone and may have a positive or negative timing difference. In the case in which the UL zone is time shifted with respect to the DL zone, the UL zone allocated to the 16m starts at a difference corresponding to the DU-OFFSET with respect to the DL zone. Here, the legacy UL zone is not affected by the DU-OFFSET since the legacy UL zone starts after a predetermined idle time from the end of the DL zone as described above. That is, the DU-OFFSET may be used without affecting the legacy MS. Here, the DU-OFFSET needs to satisfy a condition of the following Equation 2.

$$0 \leq DU\text{-}OFFSET \leq \text{length (or duration) of one subframe} - RTG2$$

The frame structure that supports the F-FDD MS and the legacy H-FDD MS using the above structure may be represented as illustrated in FIG. 6. Here, since the F-FDD MS does not require an interval for switching, there is no need to puncture or set a subframe as an idle time in order to create the switching interval.

Figure 8:
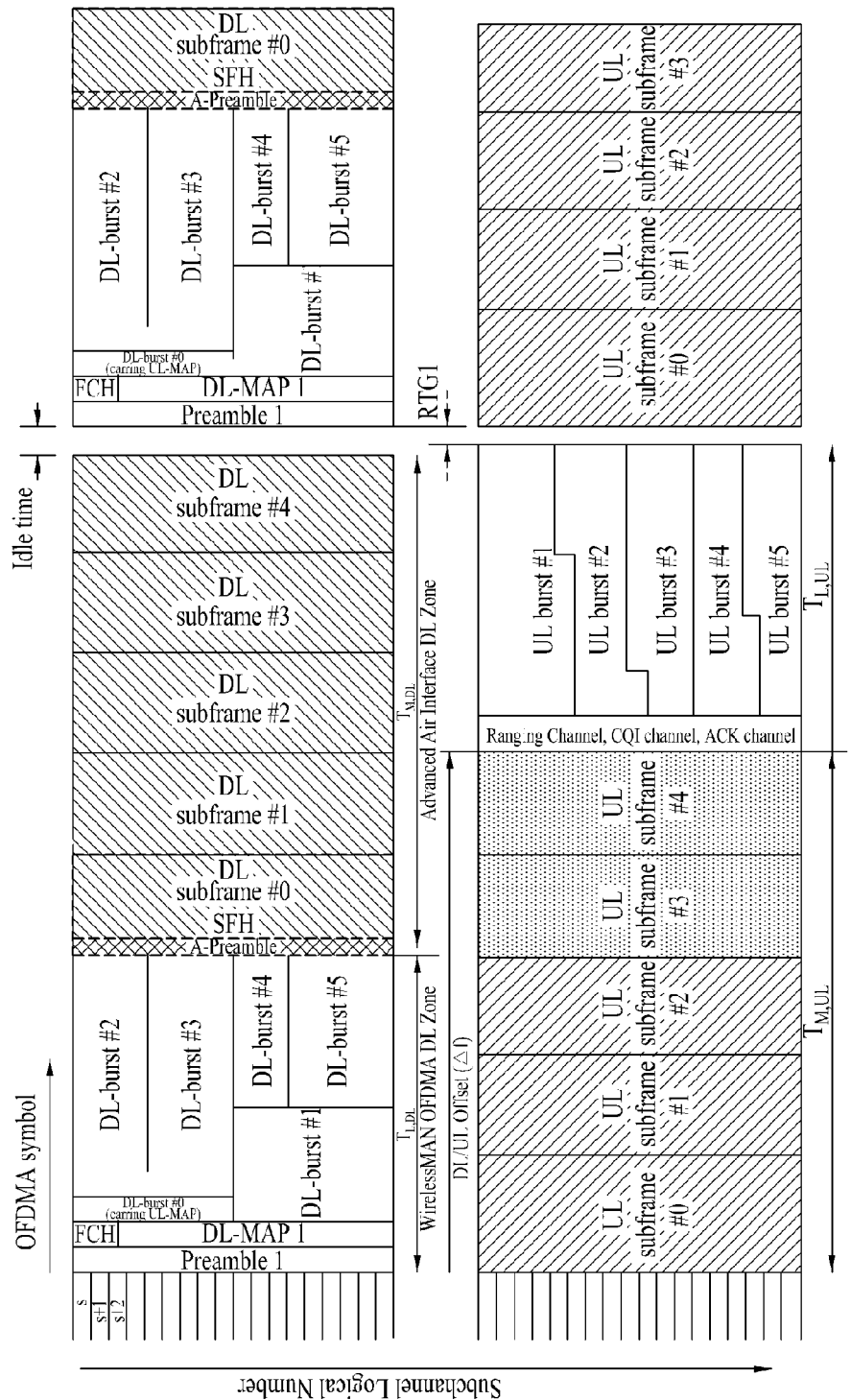
FIG. 8 illustrates an example of an FDD frame structure for supporting the legacy system using an H-FDD frame structure.

FIG. 8 illustrates an example of an FDD frame structure for supporting the legacy system using an H-FDD frame structure.

Specifically, FIG. 8 shows a frame structure for supporting all of the legacy and 16m H-FDD MSs and 16m F-FDD MSs when the legacy and 16m H-FDD MSs and 16m F-FDD MSs are present together. In order to support the F-FDD MS that uses the 16m system in the H-FDD frame structure for supporting the legacy system suggested in the above example, a frame may be constructed such that a specific portion (in units of subframes or symbols) of a UL zone and a specific portion (in units of subframes or symbols) of a DL zone allocated to 16m overlap each other. Here, the H-FDD MS cannot use the overlapping region since it needs to receive an important signal transmitted in the DL zone (for example, an A-preamble or a superframe header). However, since the F-FDD MS can transmit data using the allocated UL zone while receiving a signal through the downlink, the F-FDD MS can use the overlapping portion of the downlink and the uplink.

In addition, since the DL and UL zones overlap each other in the F-FDD MS that uses the 16m system, there is no need for the legacy system to set an interval for an additional idle time (i.e., a TTG) for DL/UL switching. In addition, when the idle time is greater than the RTG1 shown in FIG. 8, there is no need to additionally construct a frame for the RTG1 and therefore resources can be efficiently allocated without an additional idle time in the DL/UL zone to construct a frame.

The legacy MS may determine (or acquire) information of the zones allocated to the two systems by receiving a DCD or a MAP including values defined in the legacy system. Here, the transmitted TTG value may be set to be equal to the length of an interval in which the downlink and the uplink overlap. The BS needs to transmit information associated with zones allocated to the H-FDD MS and the F-FDD MS respectively to the H-FDD MS and the F-FDD MS. Here, the zone allocation information transmitted from the BS to the H-FDD MS and the F-FDD MS may include the start position of the zones allocated to the MSs, the durations of the allocated zones, frame configuration information, and the like. The BS may transmit the zone allocation information to each MS using important information (for example, an A-preamble and a superframe header) that is transmitted in the first frame of a superframe.

As shown in FIG. 8, the BS may transmit information regarding the start point of the DL zone to both the H-FDD MS and the F-FDD MS using a DL/UL offset. Here, the BS may transmit information regarding the number of symbols of the zone allocated in the downlink and the offset information, together with information regarding the start point of the DL zone, to allow the MS to acquire information of the allocated zone. Here, the number of allocated symbols may be expressed as 6×k taking into consideration basically defined subframes, each including 6 symbols. In the case of the H-FDD MS, there is a need to take into consideration subframes, each including 5 symbols, since one symbol is allocated as an idle time for the DL/UL switching interval. Here, in the case in which an interval for the TTG/RTG is taken into consideration in the DL zone, a frame is constructed based on subframes, each including 5 symbols, in the DL zone. In this case, a conventionally defined control channel including 6 symbols is used in the uplink such that there is no need to take into consideration an additional control channel.

In addition, in the case in which an idle time is taken into consideration in the uplink, a frame is constructed using basic subframes, each including 6 symbols, in the downlink and a subframe including 5 symbols is generated in the uplink such that new control information and a new control channel are needed. In the case of the F-FDD MS, there is no need to allocate one symbol for a DL/UL switching interval, unlike the H-FDD MS, and the interval of one symbol allocated for DL/UL switching can be further used as shown in FIG. 8. Accordingly, there is no need to set an additional idle time for DL/UL switching in the DL/UL zone and therefore the downlink/uplink can be constructed using the basic subframe structure.

In the case in which the lengths (or durations) of regions allocated to the two MSs in the DL zone are different, the number of symbols allocated to each MS may be determined taking into consideration the basic subframe structure. Information of the length of a frame of a region allocated to each MS may be provided to other MSs by transmitting the information of the length of the frame to each of the MSs or by transmitting a corresponding offset value with respect to basic information regarding the MS (for example, the F-FDD MS). In the UL zone, the H-FDD MS may be unable to use a certain portion of the zone allocated to 16m, i.e., an overlapping UL zone shown in FIG. 8, unlike the DL zone.

Accordingly, in the UL zone, the H-FDD MS uses a portion of the resources allocated to the 16m system. Thus, information regarding the allocated UL zone is transmitted to the H-FDD MS to allow the H-FDD MS to use the information of the allocated UL zone. Here, the transmitted information of the UL zone allocated to the H-FDD MS may be defined as the number of allocated symbols or the number of subframes or may be defined as a ratio with respect to the entire allocated region. In addition, the position of an interval that can be used in the allocated region may start from the first frame as shown in FIG. 8 or may start from another frame unlike FIG. 8. That is, the position of the interval allocated for the H-FDD MS is not limited within a non-overlapping UL zone. In the case in which the start point of the frame (or zone) is not fixed, the BS may notify the MS of the start position of the allocated region through an A-MAP, which is transmitted every frame, using an offset (in units of symbols or in units of subframes) with respect to the start point of the frame.

In another example for supporting the F-FDD MS and the H-FDD MS together with the legacy MS in the 16m system, a frame structure of the UL zone may be configured using Frequency Division Multiplexing (FDM). This frame structure may be applied to both the case of FIG. 3 in which a 5-symbol subframe structure is used in the UL zone and the case of FIG. 5 in which a 5-symbol subframe structure is used in the DL zone.

Figure 9:
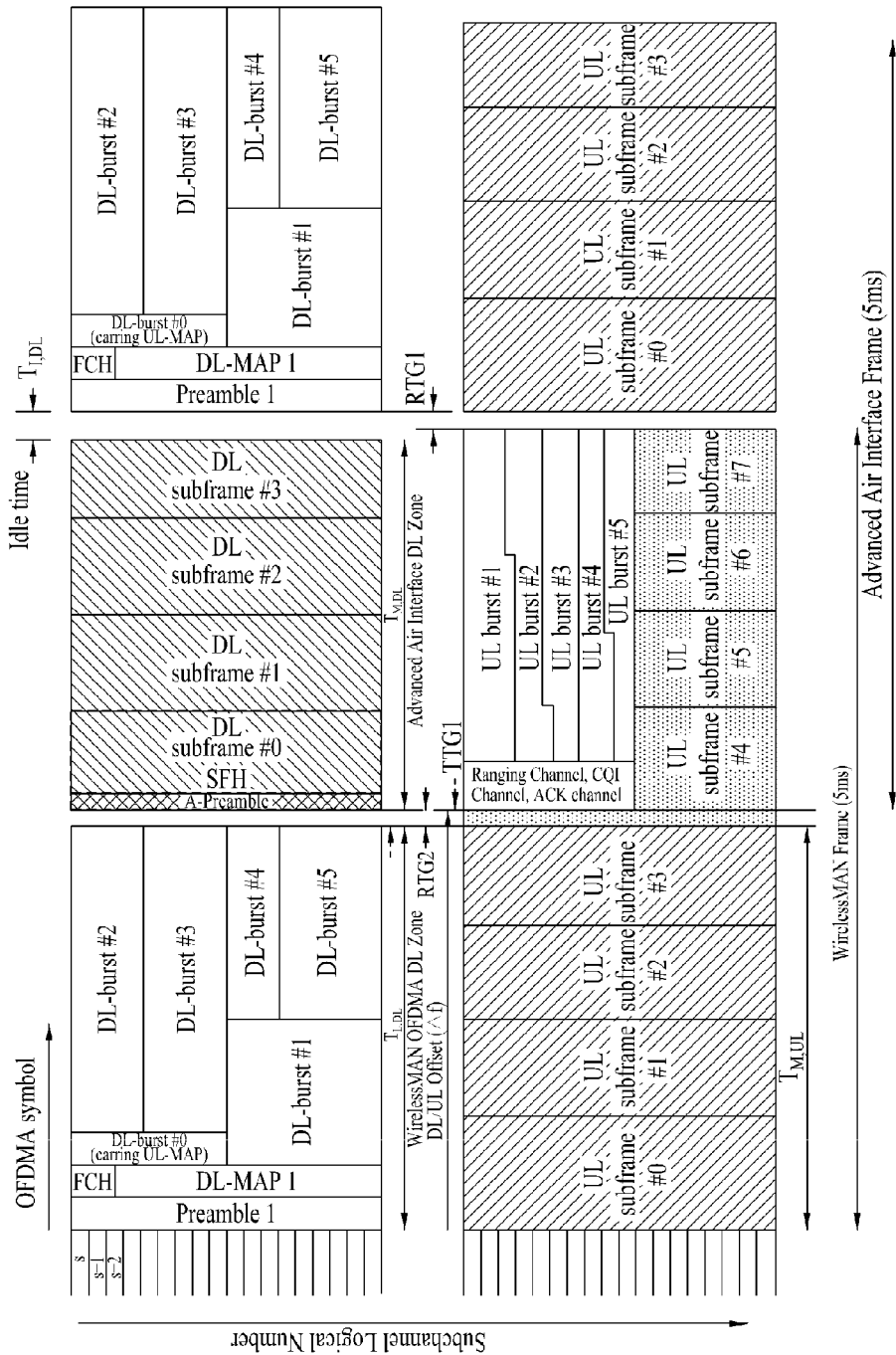
FIG. 9 illustrates an example of an FDD frame structure for supporting the legacy system using the FDD frame structure shown in FIG. 5.

FIG. 9 illustrates an example of an FDD frame structure for supporting the legacy system using the FDD frame structure shown in FIG. 5.

As shown in FIG. 9, the legacy system and the 16m system support the MSs using zones allocated to the two systems based on a conventionally defined H-FDD frame structure. Here, a UL zone for supporting the legacy system may be configured according to an FDM scheme and a portion of the UL zone may be allocated for the 16m F-FDD MS. Since a portion of the UL zone of the legacy system is allocated and used for the 16m F-FDD MS, the BS needs to transmit additional allocation information to the F-FDD MS. Since the H-FDD MS and the F-FDD MS basically use a UL zone allocated to 16m, the 16m F-FDD MS may use the allocated resources by receiving duration information of the allocated section and DL/UL offset information transmitted through an A-preamble (or a superframe header or an A-MAP) and the additional allocation information.

However, the F-FDD MS does not need to additionally receive allocation information of a region that is allocated in an FDM manner within the legacy UL zone. Allocation information of the UL zone that is allocated in an FDM manner within the legacy UL zone for the 16m F-FDD MS may be determined (or identified or acquired) using a DL/UL offset$_{UL}$ and a UL_frequency_offset. Here, in the case in which the F-FDD can receive information of the legacy system, it is possible to determine the start point of a region that is allocated in an FDM manner within the UL zone using an RTG2 of 16m of a TTG1 of the legacy system and a DL/UL offset which includes start point information of the DL zone. Here, the UL_offset includes an offset value of the region, which has been allocated in an FDM manner, from the start point of the UL zone. The offset value indicating the position may be represented as in the following Equations 3 and 4.

$$\text{DL/UL offset}_{DL} = T_{L,DL} \quad \text{[Equation 3]}$$

$$\text{DL/UL offset}_{UL} = T_{L,DL} + TTG1 \quad \text{[Equation 4]}$$

In the case in which F-FDD cannot receive information regarding the legacy system, it is possible to additionally set a DL/UL offset to be transmitted to the F-FDD MS and to transmit allocation information of the region, which has been allocated in an FDM manner in the UL zone, through the set offset information. Such information may be transmitted to each of the F-FDD and H-FDD MSs while being included in important information (for example, an A-preamble or a superframe header) that is transmitted in the first frame of a superframe or may be transmitted to each of the F-FDD and H-FDD MSs through an A-MAP of a corresponding frame, which is transmitted every frame.

In the FDD structure suggested for supporting both the legacy system and the IEEE 802.16m system, the zone for the legacy system and the zone for the IEEE 802.16m system may be located at positions opposite to those shown in FIGS. 3 to 9. That is, a frame may be constructed such that the zone allocated for the IEEE 802.16m system is first arranged and the zone allocated for the legacy system is subsequently arranged. The present invention does not limit the ratio of the DL/UL for the allocated zones shown in FIGS. 3 to 9. The frame structures of FIGS. 3 to 9 are configured assuming that important signals such as an A-preamble and a superframe header are transmitted in the first frame of a superframe. Since important signals such as an A-preamble and a superframe header are not transmitted in frames other than the first frame within the superframe, there is no need to set an additional idle time for receiving such important signals in the frames other than the first frame. Accordingly, it is possible to more efficiently use frames in the downlink and the uplink.

Figure 10:
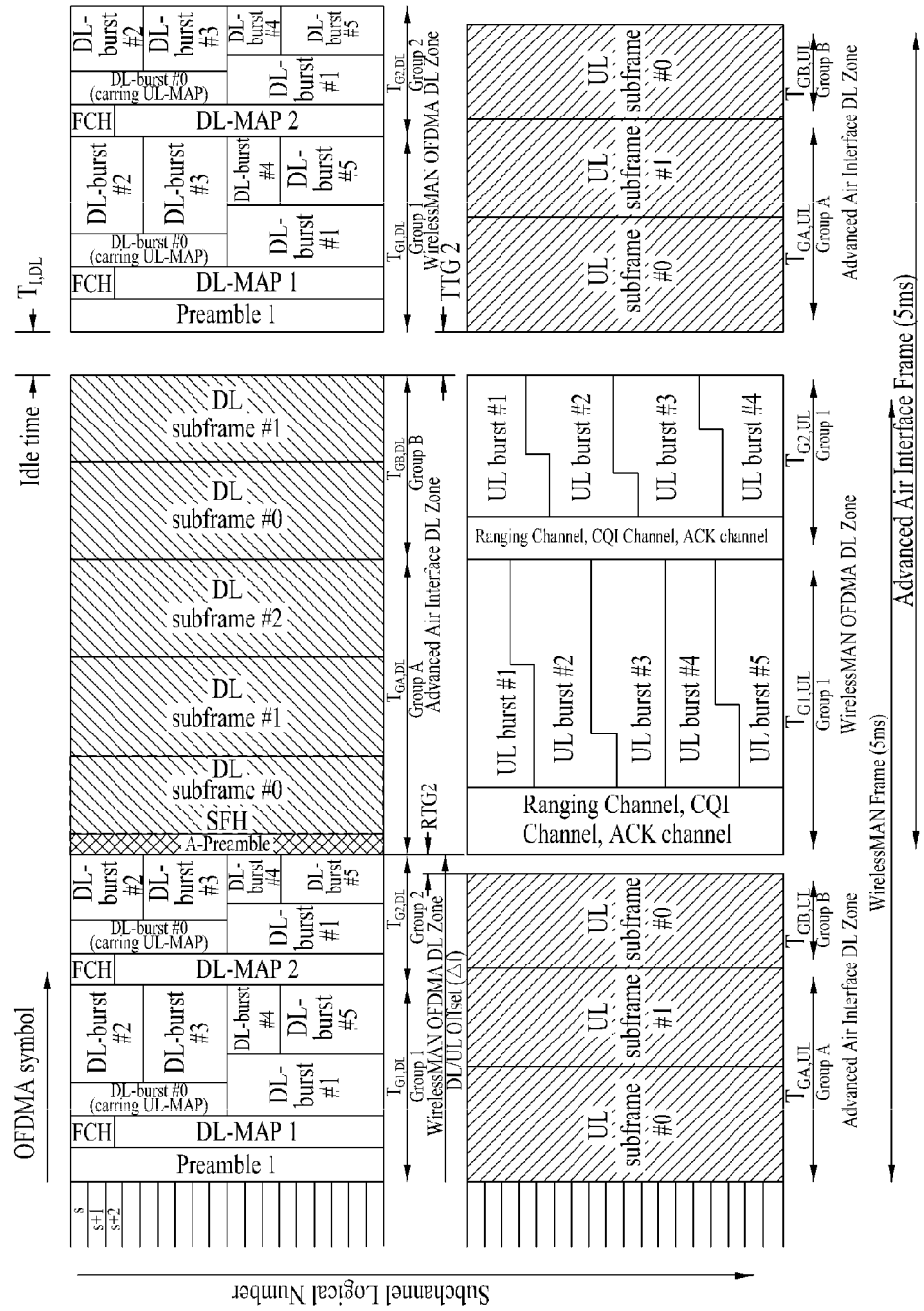
FIG. 10 illustrates an example of an FDD frame structure for supporting two different systems and an H-FDD MS.

FIG. 10 illustrates an example of an FDD frame structure for supporting two different systems and an H-FDD MS.

As shown in FIG. 10, for simultaneously supporting the legacy system and the advanced system, each of the DL zone and the UL zone of the two systems may be divided into two groups as in the conventional Time Division Duplexing (FDD) frame structure. The DL and UL zones allocated in this configuration may be arranged such that the order of the DL and UL zones of one of the two systems is opposite to that of the other system in the suggested FDD frame structure so that the DL and UL zones of the two systems are arranged in a symmetrical form.

The MS that uses the two systems may not only be an F-FDD MS but may also be an H-FDD MS. The frame structure shown in FIG. 10, in which the two systems are present together, can support the H-FDD MS. The frame structure shown in FIG. 10 is an FDD structure for supporting the 16m MS while sufficiently supporting the H-FDD MS of the legacy system. The frame structure can support the legacy system and the 16m MS by allocating a specific portion in the DL/UL zone of each divided group in the conventional legacy H-FDD signal to 16m. Here, although, in the DL frame structure and the UL frame structure, a DL_residue time and a UL_residue time may be defined to be identical to an idle time which is determined according to the CP length, the size of an OFDMA symbol, the duration of a frame in the legacy FDD frame structure, the DL_residue time and the UL_residue time may also be defined as times which have different values in the DL and the UL zones through basic system parameters of the two systems, the DL/UL length of each system, and an additional idle time.

For example, a frame may be defined on a symbol basis (or in unit of symbol) in the legacy system while a frame may be defined on a subframe basis (or in unit of subframe) in the 16m system. Accordingly, the DL and UL frame structures may have different idle times and may also have the same idle time. It is possible to efficiently use a given frame without loss by using different idle times in the downlink and the uplink. Specifically, in the DL frame structure, an additional interval for the idle time may not be arranged between DL zones allocated to the two systems but instead the DL zones allocated to the two systems may be consecutively arranged, thereby reducing loss due to the additional interval. Since the additional interval for the idle time is not set within the DL zone, 16m DL subframe may be constructed in units of 6 symbols according to the basic subframe structure. Accordingly, the number of symbols allocated to the legacy system may be represented as 6×n. Since the additional idle time is not set in the DL zone, there is a need to take into consideration a TTG/RTG or the like in the UL zone structure.

By arranging the downlink zones and the uplink zones of the two systems to be separated from each other as shown in FIG. 10, it is possible to eliminate the additional idle time for the TTG/RTG defined in the conventional H-FDD frame when supporting the H-FDD MS in the two systems or in one of the systems. For example, in the case in which the two systems support the H-FDD MS, a section allocated to the legacy system and a section allocated to the 16m system according to a TDM scheme may be divided into groups (group 1 and group 2) and (group A and group B) as shown in FIG. 10. Here, each group may be arranged in a section defined using the H-FDD frame structure. An H-FDD MS that belongs to the group 1 which is supported by the legacy system can receive data from the BS using a DL region allocated to the group within the allocated section and the DL zone for the group 2 may be arranged subsequent to the DL zone for the group 1.

Accordingly, there is no need to define an additional interval for the TTG/RTG since the DL and UL sections of the group 1 of the legacy system are generally separated from each other by the DL section of the group 2 of the legacy system. That is, the DL and UL sections of the group 1 are separated from each other by a time length of $T_{G2\_DL}$. Therefore, there is no need to define an additional idle time for the TTG or RTG in all DL and UL sections in a frame in each of the systems. As a result, it is possible to efficiently use sections (or regions) given for the H-FDD MS without loss due to allocation of the additional idle time. In addition, although, in the conventional H-FDD structure, a frame is configured such that the DL and UL zones of the two systems are arranged in opposite order taking into consideration DL/UL switching, a frame does not necessarily need to be configured such that the DL and UL zones are arranged in opposite order due to the interval between groups in the suggested structure.

In the FDD frame structure suggested in FIG. 10, in the case in which two systems that are present together in the structure support the H-FDD MS, there is no need to exclude the section, in which an important signal of the downlink is transmitted, from the UL zone in order to allow the MS to receive an important signal transmitted from each system. This is because (regions of) the two systems are arranged according to a TDM scheme in order to support the H-FDD MS and the downlink and the uplink are arranged to be separated from each other such that the DL FDD frame structure and the UL FDD frame structure of the two systems are arranged in opposite order. Thus, since the DL/UL frame structures of the two systems match each other when arranged in the opposite order, it is possible to use an interval that is not used in the uplink for transmission of an important signal in the downlink in the H-FDD frame structure, thereby allowing the BS to efficiently transmit data without loss of an additional interval in a UL FDD frame.

Specifically, since the DL and UL zones of the two systems are arranged in opposite order, there is a need to arrange a DL frame of the 16m system arranged at the second section of a DL FDD frame and a UL frame of the 16m system arranged at the first section of a UL FDD frame such that the DL frame and the UL frame do not overlap each other. An important signal of each system needs to be transmitted from a corresponding system regardless of groups defined for discriminating H-FDD MSs in the system. For example, in the case of a 16m system that uses the second section of a DL FDD frame in the example of FIG. 10, an important signal (for example, an A-preamble or a superframe header) transmitted through the section of the group A needs to be received by all MSs belonging to both the groups A and B. Accordingly, to allow the MSs to receive such a signal, a UL section used by the 16m system in the UL FDD frame should not overlap a section in which an important signal is transmitted in the DL FDD frame. A DL/UL gap is defined in order to avoid such overlapping as shown in FIG. 10. The DL/UL gap may be represented as in the following Equation 5.

$$\text{DL/UL gap} = (T_{G1\_DL} + T_{G2\_DL}) - (T_{GA\_UL} + T_{GB\_UL}) = \text{RTG2} \qquad \text{[Equation 5]}$$

Here, the DL/UL gap is determined by the duration of a section defined according to the size of an OFDMA symbol and the CP length of each of the two systems and this section can be allocated and used for the legacy system and therefore an additional idle time need not be generated. That is, the section of an idle time for an RTG2 may not be set and the section may be allocated and used for the legacy system, thereby making it possible to efficiently use frames. In addition, in the case in which a DL/UL gap for switching is set, an additional idle time is not set for the section and therefore there is a need to set such a DL/UL gap in the UL zone.

Accordingly, one symbol of the last subframe in a UL zone allocated to the group B located at the second section in a UL zone allocated to the 16m system may be allocated for the DL/UL gap. In this case, a 5-symbol subframe structure is used in the UL zone structure and a control channel corresponding to the subframe including 5 symbols is constructed. Here, a frame is constructed using the basic 6-symbol subframe structure in the DL zone. The present invention does not limit the position of the subframe including 5 symbols that is generated in the UL zone. That is, the subframe may be arranged regardless of the group in the allocated UL zone.

In addition, an idle time for DL/UL switching may be arranged in the DL zone. In this case, the subframe including 5 symbols may be arranged regardless of the group of the DL zone and a control channel and control information having a conventionally defined basic frame structure (i.e., the 6-symbol subframe structure) may be used in the uplink. In the case of the 16m system, an A-preamble and a superframe header are transmitted only in the first frame in the superframe and are not transmitted in the remaining frames. Accordingly, in other frames in the superframe, there is no need to set an additional idle time for receiving an important signal as described above. In this case, DL/UL zones of the frame may be configured using the basic subframe structure in which each subframe includes 6 symbols.

The start position of (a region of) the 16m system located at the second DL zone in a frame having a predetermined size in FIG. 10 may be obtained using the section of a group of a system that is arranged prior to the 16m system. The start position may be defined using a DL/UL offset. Taking into consideration one DL FDD frame, the DL/UL offset may be defined as in the following Equation 6.

$$\text{DL/UL offset} = T_{G1\_DL} + T_{G2\_DL} \qquad \text{[Equation 6]}$$

The DL/UL offset may indicate the start position of the DL zone of the group A of the 16m system. Here, the start position of the DL zone of the group B may be represented as in the following Equation 7 using the duration of the group A and the DL/UL offset.

$$\text{Start point of DL zone of group } B = \text{DL/UL offset} + T_{GA\_DL} \qquad \text{[Equation 7]}$$

Using the method described above, it is possible to determine the start position of each group within a UL zone allocated to a system. Since the DL/UL offset is determined using a section allocated to a system located at a front portion of the frame, the ratio of DL regions allocated to the two systems in the DL frame structure is determined according to the duration of a DL zone allocated to one of the systems that is arranged at a front portion of the frame. In addition, the ratio of UL regions of the two systems is affected by the ratio of DL regions.

In the case in which the orders of the DL and UL zones of the two systems are opposite to each other as shown in FIG. 10, the DL/UL offset defined in the above Equation 6 may be represented as a position of the start point of the UL zone of the 16m system. The DL and UL zones of the H-FDD MS cannot overlap each other. Here, the DL/UL offset is determined based on the section of the UL zone of the legacy system which is present in the UL FDD frame. The UL zone of the legacy system A should not overlap the DL zone of the legacy system and the DL/UL offset may be defined as in the following Equation 8 taking into consideration an idle time between the two systems and the UL zone of the legacy system.

$$\text{DL/UL offset} = T_{G1\_UL} + T_{G2\_UL} + \text{TTG2} + \text{RTG1} \quad \text{[Equation 8]}$$

The DL/UL offset may indicate the start point of each of the downlink and the uplink of a system in the FDD frame structure and may also indicate the start point of each of the downlink and the uplink allocated to a group including the MS which uses the H-FDD frame structure in the same system. This DL/UL offset may be defined on a subframe or symbol basis. An MS which is supported by the two systems can easily determine the start point of the DL/UL arranged for the MS through the DL/UL offset.

Even when the start points of the DL zone and the UL zone in the FDD frame structure are different, the frame durations of the allocated DL/UL zones remain unchanged. Therefore, it is possible to easily locate (or determine) the start points of the DL and the UL allocated to the system using the DL/UL offset and the offset of the start points of the DL zone and the UL zone. In this manner, it is possible to use a variety of configurations of DL and UL zones. A frame duration (expressed by the number of subframes or the number of symbols) allocated to each group, frame configuration information and allocation information of a region allocated to each group, an indicator of a group to which the MS belongs, and a DL/UL offset transmitted for supporting the H-FDD MS that uses the 16m system may be transmitted to the MS through an A-MAP which is transmitted every frame or may be transmitted through an important signal (A-preamble or a superframe header) that is transmitted through the first frame of a superframe.

The regions of the two systems may be defined in the FDD frame structure as shown in FIG. 10. Here, in the case in which the 16m system uses a band of 5/10/20 MHz in a section in which the 16m system is arranged, all DL subframes may be constructed as type-1 subframes when an F-FDD MS is supported or when one or more groups are set for supporting the H-FDD MS in the section allocated to the 16m system or all subframes may be constructed as type-1 subframes when the UL or DL/UL gap is 0.

In the case in which one symbol is allocated as the DL/UL gap, only the last subframe may be constructed as a type-3 subframe and the remaining subframes may be constructed as type-1 subframes. This configuration is only an example and various DL and UL sizes may be defined and accordingly the allocated frames may be constructed using the conventionally defined type-1, type-2, and type-3 subframes.

It is possible to consider the case in which, to support the legacy and 16m H-FDD MSs, DL/UL zones of each system are allocated in DL/UL zones which are each defined as groups in the frame structure for supporting the H-FDD MS of the legacy system, unlike the frame structure suggested in FIG. 10. This scheme has an advantage in that it has no influence upon the legacy system since the conventional H-FDD frame structure is directly applied. It is also possible to efficiently use given resources since an additional idle time for a TTG/RTG is not defined for DL/UL switching between the existing groups.

Figure 11:
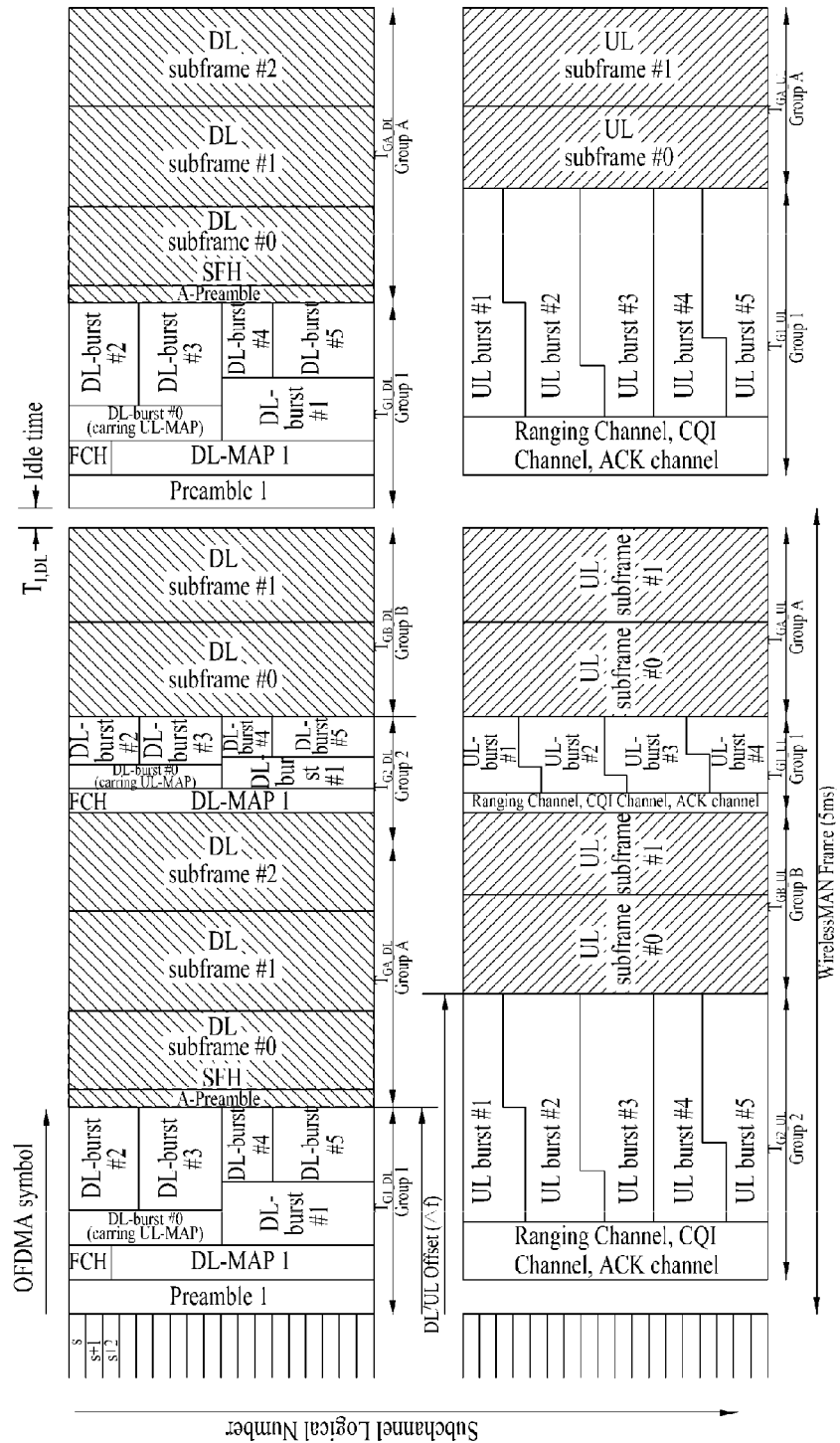
FIGS. 11 and 12 illustrate an example of an FDD frame structure for supporting two different systems and an H-FDD MS.
Figure 12:
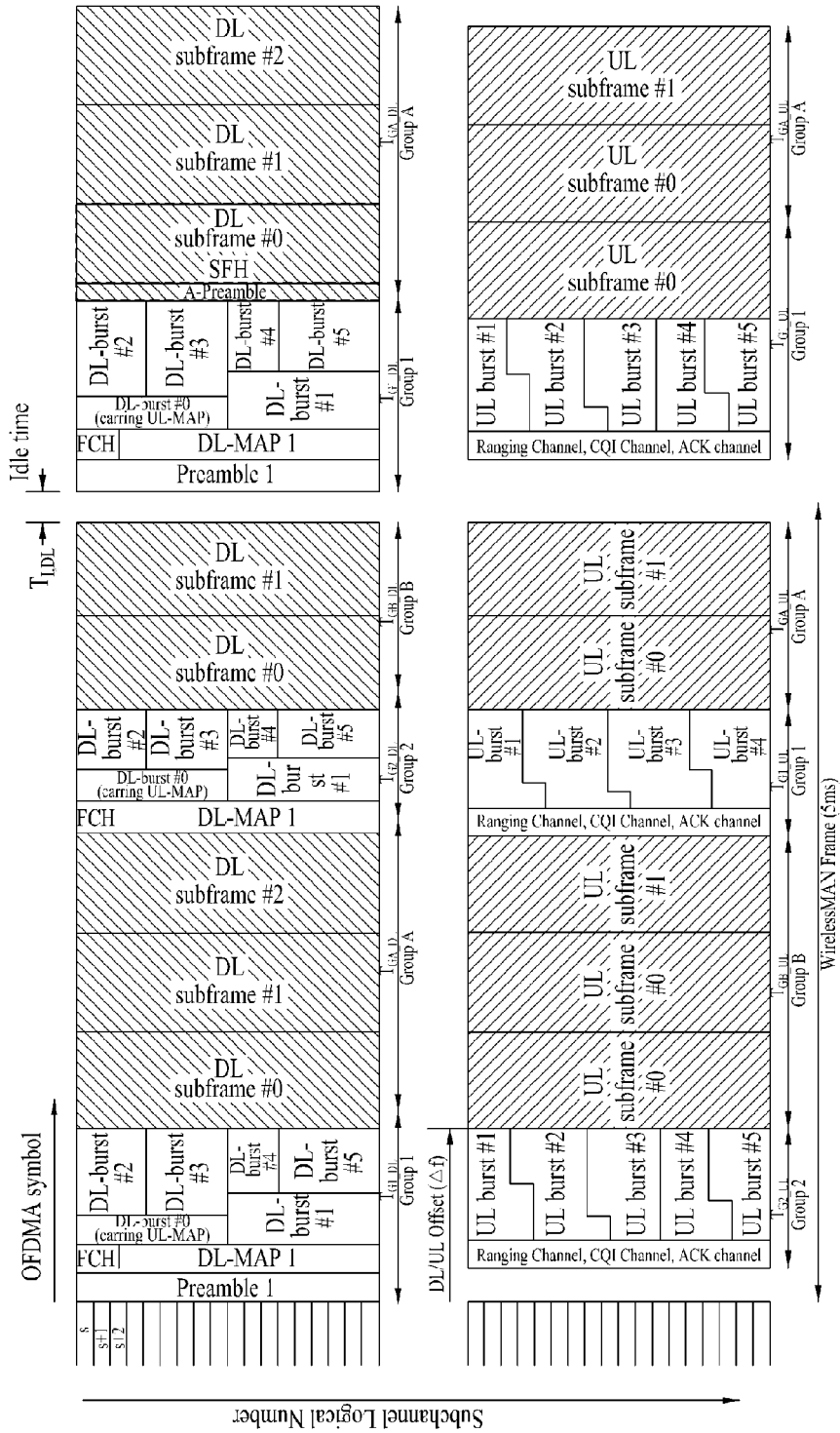

FIGS. 11 and 12 illustrate an example of an FDD frame structure for supporting two different systems and the H-FDD MS.

As in a frame structure shown in FIG. 11, a DL zone, which is allocated for one group in the conventional H-FDD frame structure in the above example, may be divided and allocated as respective DL zones of the two systems. That is, a zone, which is allocated as a DL zone of the conventional group 1 in the above example, is divided into group 1 of the legacy system and group A of the 16m system. Other groups also have such a divided frame structure. That is, DL/UL zones of the 16m system are present between the DL zone and the UL zone of the group 1 and there is no need to set an additional idle time for the interval of the TTG/RTG for DL/UL switching in order to construct a frame since the length (or duration) of each of the zones is greater than the TTG/RTG. The same may be applied to the case of the 16m system.

That is, since an additional idle time is not set in the DL/UL zones when supporting H-FDD MSs of the two systems, it is possible to efficiently construct an allocated frame region using a conventionally defined frame structure. For example, in the case of the 16m system, a frame is constructed using the basic subframe structure in which each subframe includes 6 symbols. Since the conventional H-FDD frame structure is used, there is no need to transmit an additional signal in the case of the legacy system. However, there is a need to transmit allocation information of the allocated DL/UL zones in the case of the 16m system. The start positions of the allocated DL/UL zones may be signaled to the MS using a DL/UL offset. An H-FDD MS which uses the 16m system may determine the start position of a DL zone and the start position of a UL zone using a DL/UL offset which may be represented as in the following Equation 9.

$$\text{DL/UL offset\_DL} = TG1\_DL$$

$$\text{DL/UL offset\_UL} = TG2\_UL \quad \text{[Equation 9]}$$

Here, each of the DL/UL offsets indicates the length of a duration from the start point of a frame to a corresponding DL/UL zone. The DL/UL offset may be individually defined for each group or the start point in a group of each system may be determined taking into consideration the duration of a frame allocated to each system.

For example, in FIG. 11, an MS belonging to group B of the 16m system may determine the start position of a 16m DL zone by receiving the DL/UL offset and may obtain the start position of a corresponding group using the ranges of the frame allocated to the group A and the group 2 of the legacy system. Accordingly, the position of the DL/UL start point of each group of the 16m system is represented as in the following Equation 10 and Equation 11 taking into consideration the DL/UL offset and information of the allocated region of the legacy system.

$$\text{DL start point of group } A \text{ of } 16m \text{ system} = T_{G1\_DL}$$

$$\begin{aligned}\text{DL start point of group } B \text{ of } 16m \text{ system} &= T_{GA\_DL} + \\ T_{GA\_DL} + \text{DL/UL offset}_{DL} & \end{aligned} \quad \text{[Equation 10]}$$

$$\begin{aligned}\text{DL start point of group } A \text{ of } 16m \text{ system} &= T_{GB\_UL} + \\ T_{G1\_UL} + \text{DL/UL offset}_{UL} & \end{aligned}$$

$$\text{DL start point of group } B \text{ of } 16m \text{ system} = T_{G2\_UL} \quad \text{[Equation 11]}$$

One symbol of a UL frame of the 16m group 2 is allocated and used as a DL/UL switching interval in order to receive an important signal (for example, an A-preamble or a superframe header) that is transmitted in the 16m system. Here, the allocated interval may be used as an idle time or may be allocated and used for the legacy system. Since the 16m system MS uses one UL symbol as a switching interval in order to receive an important signal, a UL zone may be constructed using a subframe including 5 symbols. As shown in FIG. 11, a frame may also be constructed using a subframe including 5 symbols, which is used in the uplink in the above example, in the downlink and using the basic frame structure in the uplink. In the case in which a DL zone is constructed using a subframe including 5 symbols, there is no need to additionally construct UL control information and a UL control channel since the UL zone is constructed using the basic frame structure in which each subframe includes 6 symbols.

As described above, there is a need to transmit information regarding the allocated zone in a frame in order to support H-FDD MSs of the two systems. In the case of the legacy system, there is no need to provide an additional signal since the basic frame structure is directly used. However, in the case of the 16m system, there is a need to receive information regarding the allocated DL/UL zone. This DL/UL zone allocation information may be transmitted while being included in an important signal, which is transmitted through the first frame of a superframe, together with a DL/UL offset for indicating the start of the frame (or zone), information (a group indicator) regarding a group to which the MS belongs, the duration of a DL/UL zone allocated to each group, frame configuration information of the corresponding group, and the like, and may also be transmitted to the MS while being included in an A-MAP which is transmitted every frame of a superframe.

The above H-FDD frame structure is a structure of the first frame in which an important signal is transmitted in a superframe. FIG. 12 illustrates an H-FDD frame structure of other frames in the superframe. In this case, a frame can be easily constructed using the basic frame structure since there is no need to take into consideration a switching interval for receiving an important signal in other frames in the superframe. In the case of FIG. 12, information of a frame allocated to a corresponding system can be determined using the same information and the same signal transmission method as those of the frame structure of FIG. 11.

In another example of the frame structure suggested in FIG. 11, a UL zone (frame) may be constructed such that the orders of zones allocated to the legacy system and the 16m system are opposite to those illustrated in FIG. 11.

Figure 13:
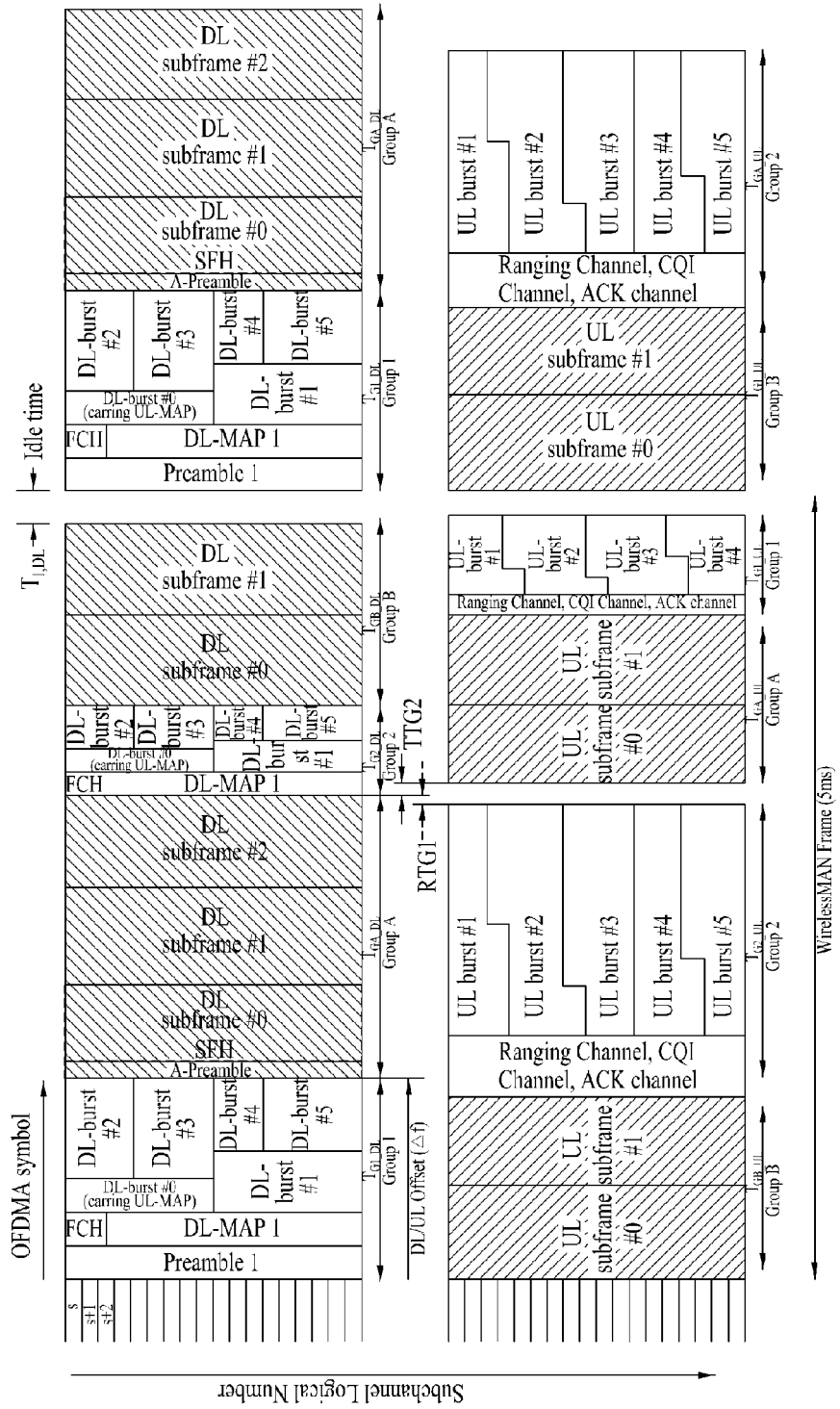
FIG. 13 illustrates an example of an FDD frame structure for supporting two different systems and an H-FDD MS.

FIG. 13 illustrates an example of an FDD frame structure for supporting two different systems and an H-FDD MS.

As shown in FIG. 13, when regions allocated to the systems are arranged in opposite order in UL zones, there is a need to generate an additional idle time that is not configured in the example of FIG. 12. Since an H-FDD MS which uses the 16m system needs to receive an important signal transmitted in group A, there is a need for the H-FDD MS to provide an additional idle time for DL/UL switching. Accordingly, one symbol for a switching interval may be allocated in a UL zone of group B of the 16m system such that a subframe including 5 symbols is allocated and used. Here, the symbol allocated for the switching interval may be allocated and used for the legacy system such that it is possible to efficiently construct a frame without setting an additional idle time between groups of the two systems. In the case in which the idle time generated when constructing a frame is greater than a TTG/RTG value required for DL/UL switching of group 2 of the legacy system and switching between DL and UL zones of the 16m system, an additional idle time for such switching is not set and therefore it is possible to efficiently construct a frame using the basic frame structure.

In the case in which the idle time is less than the TTG/RTG value required for switching, one symbol may be allocated and used for this idle time. In the case in which this symbol is allocated in 16m, one symbol is allocated in a subframe of a UL frame so as to construct a UL frame using a subframe including 5 symbols. In the case in which one symbol is allocated in the legacy frame structure, a 16m UL zone may be constructed using the basic subframe structure in which each subframe includes 6 symbols. The symbol allocated for the switching interval in the subframe of the UL zone may also be allocated to a DL zone to construct a frame. In this case, a subframe including 5 symbols may be generated in the DL zone to construct a frame while a frame is constructed using the basic frame structure in the uplink and therefore it is possible to use a conventionally defined control channel.

As described above, the 16m MS may determine the start position of a region allocated to 16m using system information and/or a DL/UL offset included in an A-MAP that is transmitted every frame or an important signal (for example, an A-preamble or a superframe header) that is transmitted in the first frame of a superframe. In the FDD frame structure for supporting H-FDD MSs of the two systems, it is possible to construct a UL zone using an FDM scheme unlike the above example in which a UL zone is allocated to the two systems using a TDM scheme. In the case in which UL zones are constructed using the FDM scheme, it is possible to construct a frame as shown in FIG. 14.

Figure 14:
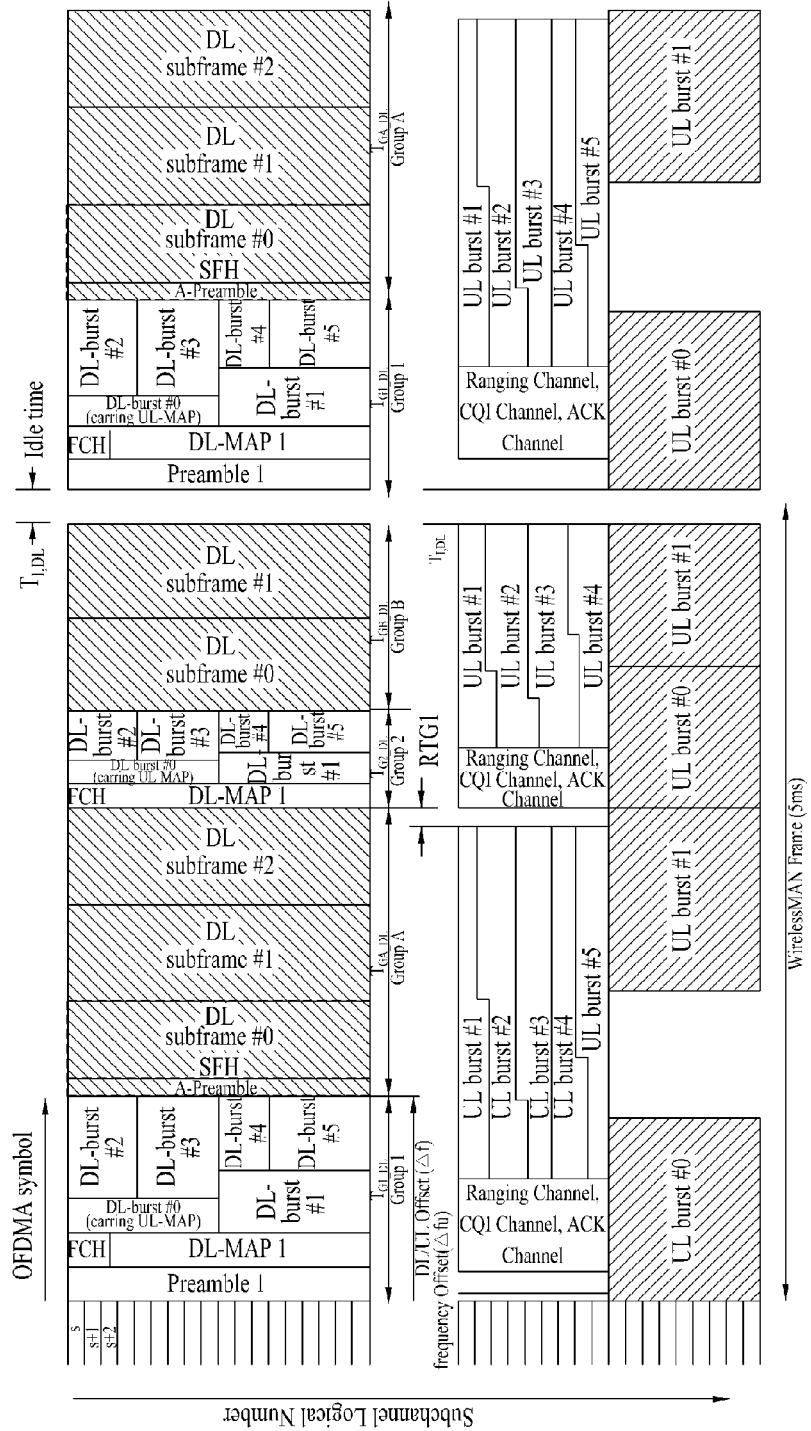
FIG. 14 illustrates an example of an FDD frame structure for supporting two different systems and an H-FDD MS.

FIG. 14 illustrates an example of an FDD frame structure for supporting two different systems and an H-FDD MS.

In the case in which a UL zone is constructed using an FDM scheme, the 16m MS needs to receive an important signal (for example, an A-preamble or a superframe header), which is transmitted in a DL zone of group A, regardless of the group, and therefore, in a region allocated to the MS, there is a need to set an idle time for a section in which the important signal is transmitted. Here, the set idle time needs to have a duration corresponding to the sum of a frame in which an important signal is transmitted and an interval for switching between the downlink and uplink. Accordingly, one symbol is allocated for such an additional idle time in the UL zone and the UL zone is constructed using a subframe including 5 symbols. In addition, when a frame of a DL zone is constructed in order to use a control channel and control information including a conventionally defined basic subframe, it is possible to use a subframe including 5 symbols. The 16m MS may determine the start position of the UL zone and the start position of the DL zone allocated to the 16m using group information regarding each system, a frequency offset, and a DL/UL offset shown in FIG. 14. The DL/UL offset, the group information of each system, and the like may be transmitted to the MS through an A-MAP or an important signal (for example, an A-preamble or a superframe header).

Figure 15:
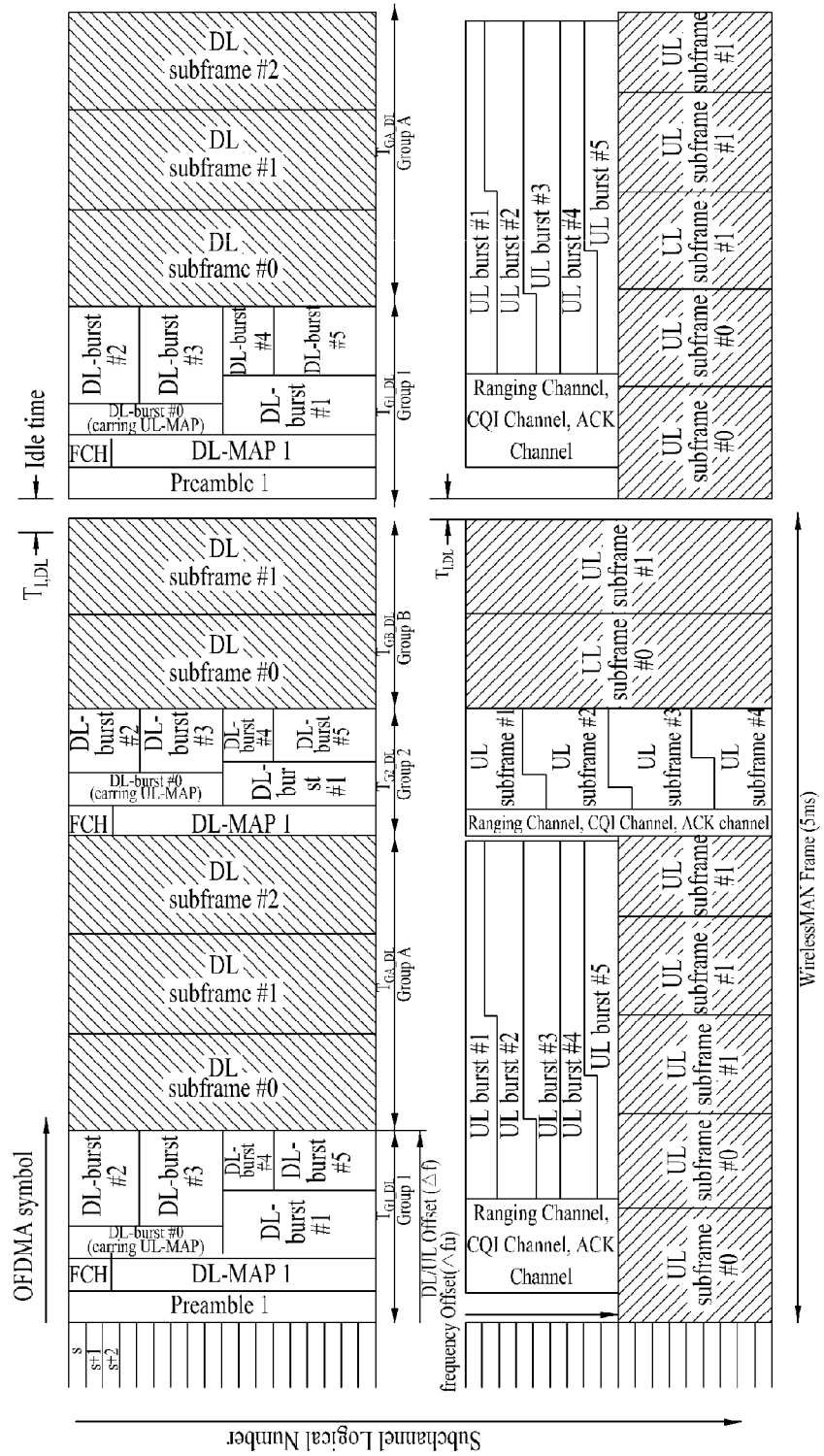
FIG. 15 illustrates an example of an FDD frame structure for supporting two different systems and an H-FDD MS.

In addition, since an important signal is transmitted only in the first frame of a superframe, the frame may be constructed using such a frame structure and the remaining frames may be constructed using the following frame structure as shown in FIG. 15 to support H-FDD MSs of the two systems.

FIG. 15 illustrates an example of an FDD frame structure for supporting two different systems and H-FDD MSs.

As shown in FIG. 15, a UL zone of each group may be partially or entirely allocated using an FDM scheme.

For all frame structures shown in FIGS. 10 to 15, a frame is constructed such that DL and UL zones allocated to the 16m system overlap each other, thereby supporting both an F-FDD MS and an H-FDD MS in the frame allocated to the 16m system. Since the H-FDD MS cannot use an interval in which the downlink and the uplink overlap, the H-FDD MS can determine (or identify) information (allocated frame position, configuration information, and the like) of an interval that is to be used by the H-FDD MS through an A-MAP that is transmitted every frame or an important signal (for example, an A-preamble or a superframe header) that is transmitted in the first frame of a superframe. All frame structures described above with reference to FIGS. 10 to 15 are only exemplary and frames may be constructed using such type-1, type-2, type-3, and type-4 subframes that are conventionally defined and, for each of the cases, the present invention does not limit regions that are allocated to a corresponding group and each system and the order of the legacy system and the 16m system.

As described above, a conventionally defined H-FDD frame structure is used to support two systems that are present together and two groups generated through division for supporting H-FDD MSs are allocated respectively to the systems, thereby achieving an H-FDD frame structure for allowing the two systems to be present together. Here, an H-FDD frame structure may be configured such that the positions of DL zones and UL zones of one of the two systems are opposite to the positions of DL zones and UL zones of the other system. That is, since the arrangements of the DL zones and UL zones of the two systems are symmetrical to each other, there is no need to allocate a specific region in the uplink to allow the MS to receive an important signal transmitted from each system. That is, it is possible to efficiently use all allocated regions in the uplink unlike the conventional system in which all MSs cannot use a specific region in the uplink to receive an important signal. A DL gap is present between DL regions that are allocated to the two systems in DL zones taking into consideration DL/UL switching of each system. Here, the DL gap may be represented in units of symbols or subframes and may have a fixed value such as 0, 1, 2, ..., or N. A structure for this H-FDD frame configuration may be represented as shown in FIG. 16.

Figure 16:
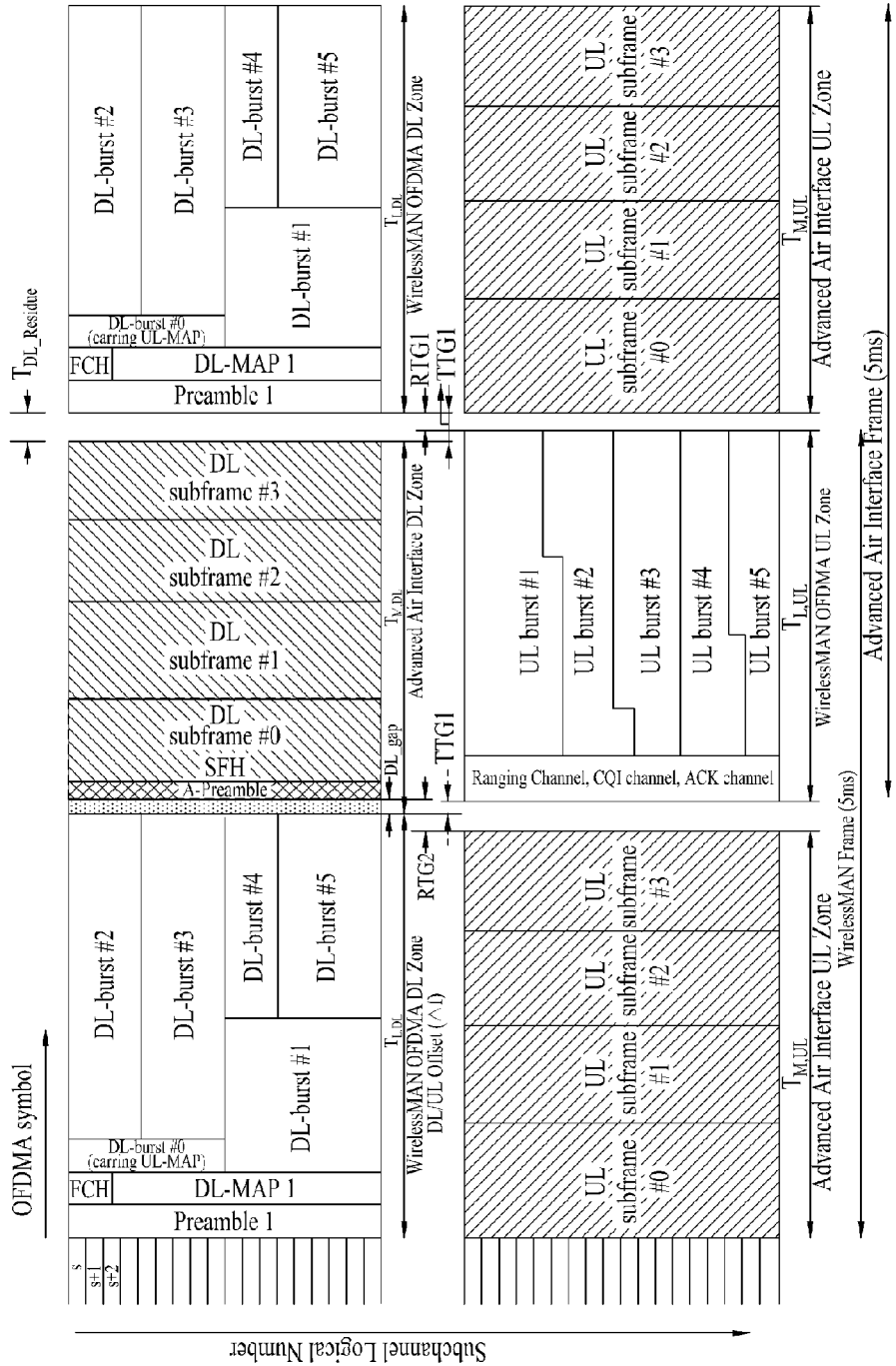
FIG. 16 illustrates an example of an FDD frame structure for supporting the legacy system using an H-FDD frame structure.

FIG. 16 illustrates an example of an FDD frame structure for supporting the legacy system using an H-FDD frame structure.

When the legacy system and the advanced system (for example, the 16m system) are supported using the H-FDD frame structure shown in FIG. 16, each of the systems requires an interval for DL/UL switching in the suggested frame structure. Here, a portion of a DL zone or a UL zone may be set and used as an idle time for the TTG/RTG for DL/UL switching. The DL_gap shown in FIG. 16, which is set to 0, may be used in the case in which the TTG/RTG value used in the conventional TDD frame structure is enough for the interval required for DL/UL switching of each system that uses the H-FDD frame structure. This region may be allocated for the legacy or advanced system. In this case, it is possible to efficiently use allocated regions without setting an additional idle time in a DL zone. However, for an MS that uses the advanced system, there is a need to receive an important signal (for example, an A-preamble, a superframe header, or an A-MAP) that is transmitted in a DL zone and a corresponding transmission/reception (Tx/Rx) switching interval is required for the MS. Here, an idle time for the switching interval may be generated by allocating one symbol in a DL zone or a UL zone. In the case in which one symbol is allocated for the switching interval in the downlink, a subframe including 5 symbols may be used in the DL zone and the conventionally defined basic subframe structure is used in the UL zone without setting an additional idle time such that predefined control information and channels can be used without affecting the system.

On the other hand, in the case in which an idle time for switching is allocated in the UL zone, a subframe including 5 symbols may be generated in the uplink to construct the UL zone. The present invention does not limit the position of a subframe including 5 symbols generated in the downlink or the uplink. In addition, information (for example, subframe types, the number of subframes of each type, the positions of subframes) associated with subframes that constitute a frame in the downlink/uplink may be transmitted to the MS through an important signal (for example, an A-preamble, a superframe header, or an A-MAP).

An MS which uses the H-FDD frame structure needs to simultaneously perform Tx/Rx conversion and band conversion when performing DL/UL switching and therefore the MS may require an interval greater than the interval for the RTG/TTG described above. Accordingly, 2 or more symbols may be allocated for such an interval. For example, in the example of FIG. 16, a DL zone may be constructed using the basic subframe structure in which each subframe includes 6 symbols in the legacy system and two symbols for the switching interval may be allocated in a DL zone allocated to the advanced system (for example, the 16m system). In this case, two subframes, each including 5 symbols, may be generated in the DL zone. Here, the subframes, each including 5 symbols, may be located at all positions other than the first subframe in the downlink. A DL_gap region generated in this case may be allocated to the legacy zone. Here, a frame may be constructed using subframes of the basic subframe structure in the uplink. In this case, a frame may be constructed by allocating 6×k symbols for the legacy system and a frame may be constructed by allocating 2×5+6×M symbols for the advanced system. In addition, a switching interval may be constructed by allocating 2 symbols respectively to a DL zone and a UL zone. Since one symbol is allocated to each of the UL and DL zones for the idle time, each of the UL and DL zones may be constructed using one subframe including 5 symbols. Here, a control channel and control information for a subframe including 5 symbols need to be generated in the uplink. The present invention does not limit the position of the subframe including 5 symbols in the UL zone. In the case of the DL zone, the subframe including 5 symbols may be located at all positions other than the first subframe in which an important signal is transmitted. The number of symbols allocated to the downlink/uplink may be represented as 5+6×M. Here, M indicates the number of subframes.

In addition, an idle time may also be set by allocating two symbols to the UL zone. Accordingly, 2 subframes, each including 5 symbols, may be generated in the UL zone to construct a frame. The symbols allocated for generating the interval for DL/UL switching of the advanced system may also be used to support the legacy system. For example, a symbol corresponding to the DL_gap region may be used to support the legacy system.

In the case of the advanced system, one subframe may be allocated for the switching interval since each frame is constructed using subframes. The H-FDD frame structure may be represented as shown in FIG. 17.

Figure 17:
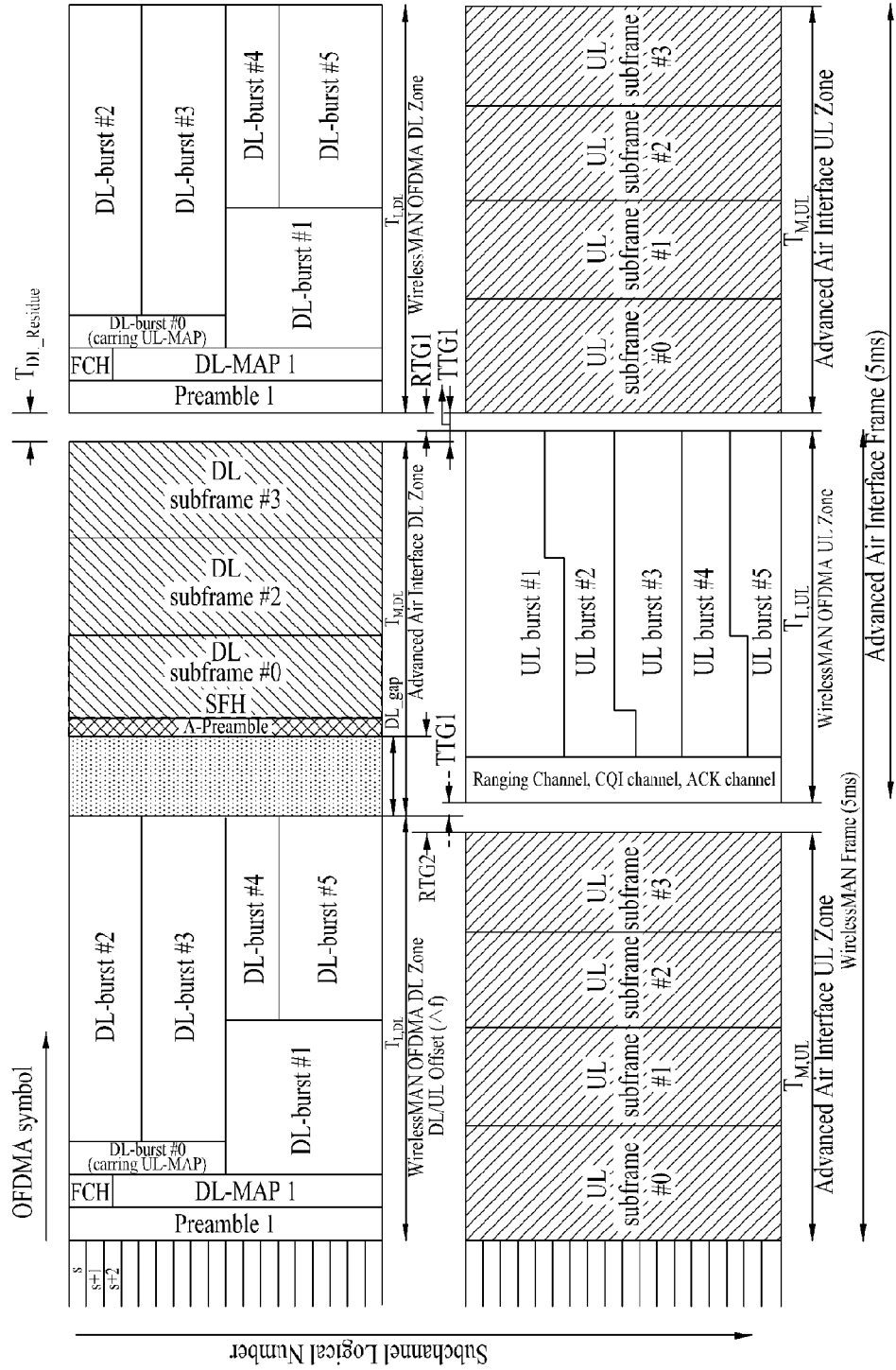
FIG. 17 illustrates an example of an FDD frame structure for supporting the legacy system using an H-FDD frame structure.

FIG. 17 illustrates an example of an FDD frame structure for supporting the legacy system using an H-FDD frame structure.

In the frame structure shown in FIG. 17, one subframe may be allocated as an interval for DL/UL switching in a DL zone allocated to the 16m system. Accordingly, a DL_gap present between (regions of) the two systems may be greater than one subframe and a portion of this region may be used to support the legacy system. Since one subframe is used for the switching interval in the DL zone, other subframes in the DL zone may be configured in the basic subframe structure in which each subframe includes 6 symbols. Accordingly, there is no need to generate an additional subframe structure. In addition, the subframe allocated for the DL/UL switching may be allocated to a UL zone. In this case, all subframes may be configured in the basic subframe structure (i.e., the type-1 subframe structure). Here, the MS may determine the structure of the corresponding frame (zone) by receiving information associated with the DL/UL zone (for example, subframe types, the number of subframes of each type, the positions of subframes, the sizes of subframes, and the like) through a superframe header or an A-MAP.

When an H-FDD operation is performed, a BS of the advanced system may transmit the number of subframes of a DL/UL zone allocated to each system to the MS using a control signal such as a superframe header or an A-MAP. Here, the H-FDD MS may determine the position of a currently used DL zone using frame parameters transmitted by the BS. Here, the parameters may be represented as in the following equations.

Index of first subframe of DL2 (i.e., Index of first subframe of DL zone of group 2)=subframes_frame−subframe_DL2+1+Z=subframe_DL1+1+Z=subframe_UL2+1+TTG2+RTG2    [Equation 12]

Number of subframes in DL2 (i.e., Number of subframes in DL zone of group 2)=subframe_DL2=subframes_frame−subframe_DL1−subframe_gap    [Equation 13]

Here, subframe_DL1 is the number of subframes of a DL zone of group 1 that is broadcast through a superframe header or an A-MAP in the current frame, subframe_DL2 is the number of subframes of a DL zone of group 2 that is broadcast through a superframe header or an A-MAP in the current frame, subframes_frame is the total number of subframes of all types (where, each of K, L, and M is an integer of 1, 2, . . . , or N indicating the number of allocated subframes, K is the number of subframes of type 1, L is the number of subframes of type 2, and M is the number of subframes of type 3), and subframe_UL2 is the number of subframes of group 2 that is broadcast through a superframe header or an A-MAP in a previous frame. Here, Z=SF_Residue (which may be omitted when allocation is performed in unit of symbol (or on a symbol basis) since the remaining region is very small), DL_gap=0 (when the number of symbols in the DL_gap is less than 6), and DL_gap=1, 2, . . . , N (when the number of symbols is greater than 6 and this value=DL_gap %6). This value is defined as the number of symbols and is represented using the number of symbols "6" of each subframe of the basic subframe structure when allocation is performed in unit of frame (or on a frame basis). Here, the type-1 subframe includes 6 symbols and the index value 1 indicates the first subframe of a DL frame.

The above Equations 12 and 13 represent the parameters transmitted by the BS in the case in which a frame is constructed in unit of subframe (or on a subframe basis). The parameters may also be represented on a symbol basis as in the following Equations 14 and 15, taking into consideration that a frame consists of a number of types of subframes.

Index of first symbol of DL2 (i.e., Index of first symbol in DL zone of group 2)=subframes_frame−subframe_DL2+1+Z=(K×6+L×7+M×5)−($K_{DL2}$×6+$L_{DL2}$×7+$M_{DL2}$×5)+1+Zsym=($K_{DL1}$×6+$L_{DL1}$×7+$M_{DL1}$×5)+1+Zsym=($K_{UL2}$×6+$L_{UL2}$×7+$M_{UL2}$×5)+1+TTG2+RTG2.    [Equation 14]

Number of symbols in DL2 (i.e., Number of symbols in DL zone of group 2)=subframe_DL2=($K_{DL2}$×6+$L_{DL2}$×7+$M_{DL2}$×5)=(K×6+L×7+M×5)−($K_{DL1}$×6+$L_{DL1}$×7+$M_{DL1}$×5)−subframe_gap×6=subframes_frame−subframe_DL1−subframe_gap    [Equation 15]

Here, subframe_DL1 is the number of subframes of a DL zone of group 1 that is broadcast through a superframe header or an A-MAP in the current frame, subframe_DL2 is the number of subframes of a DL zone of group 2 that is broadcast through a superframe header or an A-MAP in the current frame, subframes_frame is the total number of subframes of all types (where, each of K, L, and M is an integer of 1, 2, . . . , or N indicating the number of allocated subframes, K is the number of subframes of type 1, L is the number of subframes of type 2, and M is the number of subframes of type 3), and subframe_UL2 is the number of subframes of group 2 that is broadcast through a superframe header or an A-MAP in a previous frame. Here, Zsym=Number of symbols in SF_Residue+Symbol_Residue, DL_gap=0 (when the number of symbols in the DL_gap is less than 6), and DL_gap=1, 2, . . . , N (when the number of symbols is greater than 6 and this value=DL_gap %6). This value is represented using the number of symbols "6" of each subframe of the basic subframe structure when allocation is performed in unit of frame (or on a frame basis. When subframes of a different type are used, this value is represented using the number of symbols of each subframe of the different type. Here, the type-1 subframe includes 6 symbols and the index value 1 indicates the first symbol of a DL frame.

Figure 18:
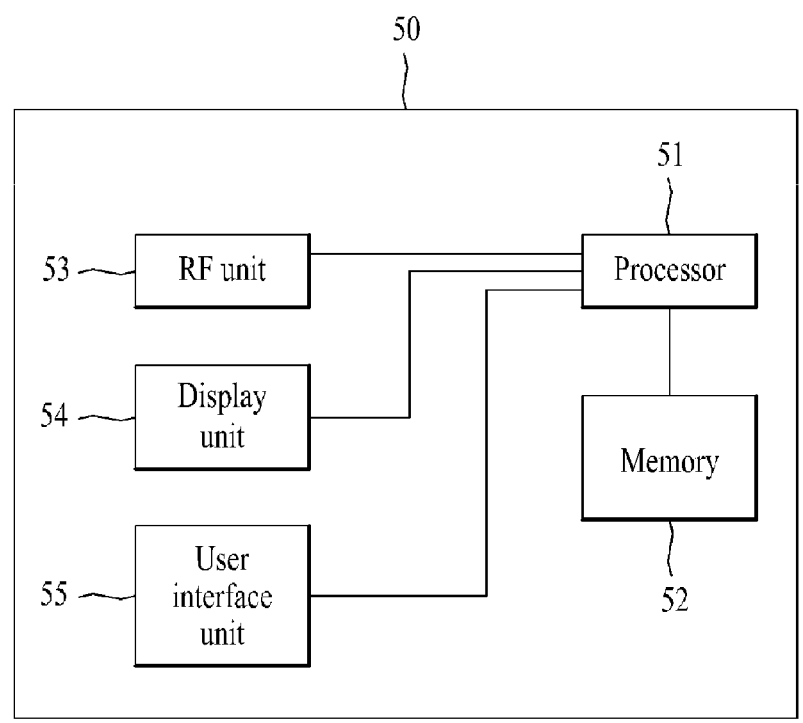
FIG. 18 is a block diagram of an apparatus 50.

FIG. 18 is a block diagram of an apparatus 50. The apparatus 50 may be an MS or a BS. The apparatus 50 includes a processor 51, a memory 52, a Radio Frequency (RF) unit 53, a display unit 54, and a user interface unit 55. Layers of a radio interface protocol are implemented in the processor 51. The processor 51 provides a control plane and a user plane. Functions of the layers may be implemented in the processor 51. The processor 51 may include a contention resolution timer. The memory 52 is connected to the processor 51 to store an operating system, applications, and general files. When the apparatus 50 is an MS or a UE, the display unit 54 displays a variety of information and may be constructed using a well known element such as a Liquid Crystal Display (LCD) or an Organic Light Emitting Diode (OLED). The user interface unit 55 may be constructed of a combination of well known interfaces such as a keypad and a touch screen. The RF unit 53 may be connected to the processor 51 to transmit and receive a radio signal. The RF unit 53 may include a transmission module (not shown) and a reception module (not shown). The RF unit 53 receives control information including zone allocation information from the BS and the processor 51 controls the apparatus 50 to perform communication with the BS through a corresponding zone based on the zone allocation information.

Layers of the radio interface protocol between the UE and the network may be classified into a first layer (L1), a second layer (L2), and a third layer (L3) based on the 3 lower layers of the Open System Interconnection (OSI) model well known among communication systems. A physical or PHY layer belongs to the first layer and provides an information transmission service through a physical channel. A Radio Resource Control (RRC) layer belongs to the third layer and provides control radio resources between the UE and the network. The UE and the network exchange RRC messages through the RRC layer.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case in which the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

A method and apparatus for performing communication using a frame structure that supports two or more wireless communication schemes may be applied to an IEEE 802.16m system, which is a mobile communication system, or the like.

The invention claimed is:

1. A method for performing communication at a mobile station (MS) using a frequency division duplex (FDD) frame structure that supports two or more wireless communication schemes, the method comprising:
receiving control information from a base station (BS), the control information including frame configuration information for the MS, the MS using a first communication scheme, the frame configuration information including information related to a subframe type of each subframe configured for the MS in a frame and a number of each subframe type configured for the MS in the frame, the subframe type being defined based on a number of symbols configured for a subframe; and
performing communication with the BS using the FDD frame structure based on the received frame configuration information,
wherein the FDD frame structure comprises a first zone for the MS and a second zone for another MS using a second communication scheme, the first communication scheme being different than the second communication scheme,
wherein an uplink zone of the first zone is multiplexed with a downlink zone of the second zone by a frequency division multiplexing (FDM) scheme and a downlink zone of the first zone is multiplexed with an uplink zone of the second zone by the FDM scheme,
wherein a start point of the uplink zone of the first zone is aligned with a start point of a preamble of the second zone in a time domain, and
wherein the downlink zone of the first zone is multiplexed with the downlink zone of the second zone by a time division multiplexing (TDM) scheme and the uplink zone of the first zone is multiplexed with the uplink zone of the second zone by the TDM scheme.

2. The method according to claim 1, wherein one symbol of a specific subframe in the downlink zone or the uplink zone of the first zone for the MS is allocated as a transition gap.

3. The method according to claim 2, wherein the specific subframe to which the transition gap is allocated is located at a last subframe.

4. The method according to claim 2, wherein the specific subframe to which the transition gap is configured by 5 or 6 symbols.

5. The method according to claim 1, wherein the control information header is received in a unit of superframe.

6. The method according to claim 1, wherein the frame configuration information further includes information related to a start point of the first zone for the MS.

7. A mobile station (MS) for performing communication using a frequency division duplex (FDD) frame structure that supports two or more wireless communication schemes, the MS comprising:
a Radio Frequency (RF) unit configured to receive control information from a base station (BS), the control information including frame configuration information for the MS, the MS using a first communication scheme the frame configuration information including information related to a subframe type of each subframe configured for the MS in a frame and a number of each subframe type configured for the MS in the frame, the subframe type being defined based on a number of symbols configured for a subframe; and
a processor configured to control the MS to perform communication with the BS using the FDD frame structure based on the received frame configuration information,
wherein the FDD frame structure comprises a first zone for the MS and a second zone for another MS using a second communication scheme, the first communication scheme being different than the second communication scheme,
wherein an uplink zone of the first zone is multiplexed with a downlink zone of the second zone by a frequency division multiplexing (FDM) scheme and a downlink zone of the first zone is multiplexed with an uplink zone of the second zone by the FDM scheme,
wherein a start point of the uplink zone of the first zone is aligned with a start point of a preamble of the second zone in a time domain, and
wherein the downlink zone of the first zone is multiplexed with the downlink zone of the second zone by a time division multiplexing (TDM) scheme and the uplink zone of the first zone is multiplexed with the uplink zone of the second zone by the TDM scheme.

8. The MS according to claim 7, wherein one symbol of a specific subframe in the downlink zone or the uplink zone of the first zone for the MS is allocated as a transition gap.

9. The MS according to claim 8, wherein the specific subframe to which the transition gap is allocated is located at a last subframe.

10. The MS according to claim 7, wherein the control information is received in a unit of superframe.

11. The MS according to claim 7, wherein the frame configuration information further includes information related to a start point of the first zone for the MS.

* * * * *